United States Patent
Hwang

(12) 
(10) Patent No.: US 7,102,096 B2
(45) Date of Patent: Sep. 5, 2006

(54) METHOD AND APPARATUS FOR ELECTRIC-DISCHARGE MACHINING OF A TURBINE BLADE

(75) Inventor: Hea-do Hwang, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 25 days.

(21) Appl. No.: 11/189,197

(22) Filed: Jul. 26, 2005

(65) Prior Publication Data

US 2006/0169675 A1    Aug. 3, 2006

(30) Foreign Application Priority Data

Jan. 28, 2005   (KR) ............... 10-2005-0007958

(51) Int. Cl.
  *B32H 9/10*    (2006.01)
  *B32H 7/26*    (2006.01)
  *B32H 1/00*    (2006.01)

(52) U.S. Cl. ............................. 219/69.17; 219/69.15

(58) Field of Classification Search ............. 219/69.15, 219/69.17

See application file for complete search history.

(56) References Cited

U.S. PATENT DOCUMENTS

| | | | | |
|---|---|---|---|---|
| 3,802,046 A | * | 4/1974 | Wachtell et al. | 219/69.17 |
| 3,814,893 A | * | 6/1974 | Helms et al. | 219/69.15 |
| 3,920,947 A | * | 11/1975 | Wachtell et al. | 219/69.17 |
| 3,963,894 A | * | 6/1976 | Wachtell et al. | 219/69.15 |
| 4,361,745 A | * | 11/1982 | Rupert et al. | 219/69.13 |
| 4,441,004 A | * | 4/1984 | Inoue | 219/69.15 |
| 5,406,043 A | * | 4/1995 | Banji | 219/69.17 |
| 6,797,912 B1 | * | 9/2004 | Derehag et al. | 219/69.17 |
| 2004/0112871 A1 | * | 6/2004 | Derehag et al. | 219/69.1 |

FOREIGN PATENT DOCUMENTS

| | | |
|---|---|---|
| KR | 10-2004-0009436 A | 1/2004 |
| KR | 10-2004-0009437 A | 1/2004 |

* cited by examiner

*Primary Examiner*—Geoffrey S. Evans
(74) *Attorney, Agent, or Firm*—Gardner Carton & Douglas LLP

(57) ABSTRACT

A method and apparatus for electric-discharge machining a turbine blade are provided. The method includes the steps of: a) preparing a disc material divided into an first portion and a second portion on a basis of a symmetrical line, b) fixing the disc material, with the first portion facing upward, c) forming an initial profile of at least one of the plurality of blades at the first portion of the disc material using at least two roughing tool electrodes to concurrently form a roughing space at the first portion, d) leading at least two finishing tool electrodes into the roughing space to concurrently perform precise machining of the blade, e) turning over the disc material, fixing the disc material and repeating steps c) and d) on the second portion.

12 Claims, 25 Drawing Sheets

METHOD AND APPARATUS FOR ELECTRIC-DISCHARGE MACHINING OF A TURBINE BLADE

CROSS-REFERENCE TO RELATED PATENT APPLICATIONS

This patent application claims the benefit of Korean Patent Application No. 10-2005-0007958, filed on Jan. 28, 2005, in the Korean Intellectual Property Office, the disclosure of which is incorporated herein in its entirety by reference.

FIELD OF THE INVENTION

This invention pertains to electric-discharge machining of a turbine blade, and more particularly, to a method and apparatus for electric-discharge machining a turbine blade, which is not limited to a shape of the turbine blade, expands an applicable range, and improves productivity and machining precision.

BACKGROUND OF THE INVENTION

In general, electric-discharge machining is a process of melting a portion of a work piece using an electric-discharge phenomenon and removing the molten portion from a non-molten portion in order to machine a desired shape of the work piece. Specifically, in electric-discharge machining, the work piece and a tool-shaped electrode suitable for the desired shape as a cutting tool are arranged spaced apart in a dielectric machining fluid. A voltage of approximately 100V is applied there between, while a distance there between is gradually closed. At that time, a spark discharge is generated at a surface of the electrode or work piece. A material of the work piece is molten or evaporated at a discharging point where the spark discharge is generated, and the work piece adjacent to the discharging point is removed by pressure of the dielectric fluid. Fine craters are continuously formed by the discharge to perform cutting.

A turbine used in an engine for industrial applications or aircraft is a mechanical component used to obtain a rotational force from a combustion gas or pressurized air by compressing air. Such a turbine may be manufactured through the above described electric discharge. One example of a method for manufacturing a turbine blade using the electric-discharge machining is disclosed in Korean Patent Laid-Open No. 2004-9436 ("the '9436 application"). A turbine provided according to the '9436 application is shown in FIG. 1. The turbine includes a disc 10 of a round plate and a plurality of blades 20 spaced apart from at regular intervals. According to the '9436 application, a plurality of reference elongated grooves 15 are formed along a flange of a disk material 1, as shown in FIG. 2. An upper right surface 11 and an upper left surface 12 are formed on the basis of the elongated grooves 15, as shown in FIG. 3, to form an upper portion relative to a symmetrical line S. After turning over and fixing the disk material, a second right surface 13 and a second left surface 14 are formed on the basis of the elongated grooves 15 to form a second portion relative to the symmetrical line S.

According to the '9436 application, in the case where there is no overlay between the blades 20, as shown in FIG. 4A, in other words, in the case of a>b, reference elongated grooves may be formed at a blade gap 10, and a tool electrode may be vertically moved to perform cutting working, as indicated by symbol P in FIG. 4A. However, when there is an overlay between the blades 20, as shown in FIG. 4B, in other words, when a≦b, since the gap between the blades 20 is not sufficient, it is not possible to form reference elongated grooves. In addition, a tool electrode is not vertically moved to perform cutting working.

A turbine with an integral shroud, in which a shroud integrally formed with outsides of the blades, cannot be manufactured through a conventional method of forming the reference elongated grooves 15 by moving the tool electrode from a cross section of the disk material 1 to the inside, as shown in FIG. 2.

Meanwhile, since the blades of the turbine are formed in a C-shape, a complete set of blades cannot be obtained through one electric-discharge machining. Accordingly, the blades are formed by electric-discharge machining the upper and second portions divided on the basis of the symmetrical line (S in FIG. 3). In this case, there is a problem in that a mismatch occurs between the upper portion and the second portion, as shown in FIG. 5. An electric-discharged machined portion at a boundary between the upper portion and the second portion is not smoothly joined and a protrusion or a stepped portion at a machined surface between the upper and second portions is formed. This obstructs a flow of fluid, such as combustion gas, passing thorough the blades, thereby causing an efficiency of the turbine to deteriorate.

In addition, one blade is formed by one tool electrode, and after the disc material is rotated in a circumferential direction, a next blade is formed by the one tool electrode. The turbine is electric-discharge machined by repeating the above process as many times as the number of the blades. Therefore, excessive machining time is required to form a plurality of blades. Also, there is another problem in that since it is difficult to keep a setting of each blade consistent; precision of the machining is seconded.

SUMMARY OF THE INVENTION

The present invention provides a method and apparatus for electric-discharge machining a turbine blade, which can manufacture various shapes of turbine blades, without being limited to a shape of the turbine blade.

Another object of the present invention provides a method and apparatus for electric-discharge machining a turbine blade, which can improve productivity and machining precision.

A further object of the present invention provides a method and apparatus for electric-discharge machining a turbine blade, which can prevent a mismatch between upper and second portions of a turbine blade.

According to an aspect of the present invention, there is provided a method for electric-discharge machining a turbine with a plurality of blades formed along a circumference thereof, comprising: a) preparing a disc material divided into an first portion and a second portion on a basis of a symmetrical line; b) fixing the disc material, with the first portion facing upward; c) forming an initial profile of the blade at the first portion of the disc material using at least two roughing tool electrodes to concurrently form a roughing space at the first portion; d) leading at least two finishing tool electrodes into the roughing space to concurrently perform precise machining of the blade; e) turning over the disc material and fixing the disc material, with the second portion facing upward; f) forming an initial profile of the blade at the second portion of the disc material using at least two roughing tool electrodes to concurrently form a roughing space at the second portion; and g) leading at least two finishing tool electrodes into the roughing space formed at the second portion to concurrently perform precise machining of the blade.

In the forming operations c and f, the roughing tool electrodes may be moved along a desired roughing lead angle to perform the machining.

The leading operations d and g may comprise firstly moving the finishing tool electrodes along a desired finishing lead angle to perform the machining; and secondarily reciprocating the finishing tool electrodes in a circumferential direction of the disc material to perform the machining.

In the leading operations d and g, the disc material may be more deeply cut by 0.1 mm to 0.3 mm relative to the symmetrical line.

The roughing tool electrodes and the finishing tool electrodes may be formed corresponding to a shape of the blade, but are formed in a different shape to each other.

According to another aspect of the present invention, there is provided an apparatus for electric-discharge machining a turbine with a plurality of blades formed along a circumference thereof, comprising: an electrode holder, to which at least two tool electrodes are arranged and mounted in a circumferential direction of the blade corresponding to the blade; and a mounting frame opposed to the electrode holder for supporting a disc material.

The tool electrodes may be arranged so as to correspond to the number of the blades, and are spaced apart from each other at a gap corresponding to one pitch of the blade.

The apparatus may further comprise an electric-discharge voltage generating unit for applying an electric-discharge voltage to the tool electrodes; a tool electrode transferring unit for moving the electrode holder in a vertical direction and a circumferential direction; and a numerical control unit for controlling the electric-discharge voltage generating unit and the tool electrode transferring unit.

DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The invention will now be described more fully hereinafter with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art. Like numbers refer to like elements throughout the specification.

Figure 6:
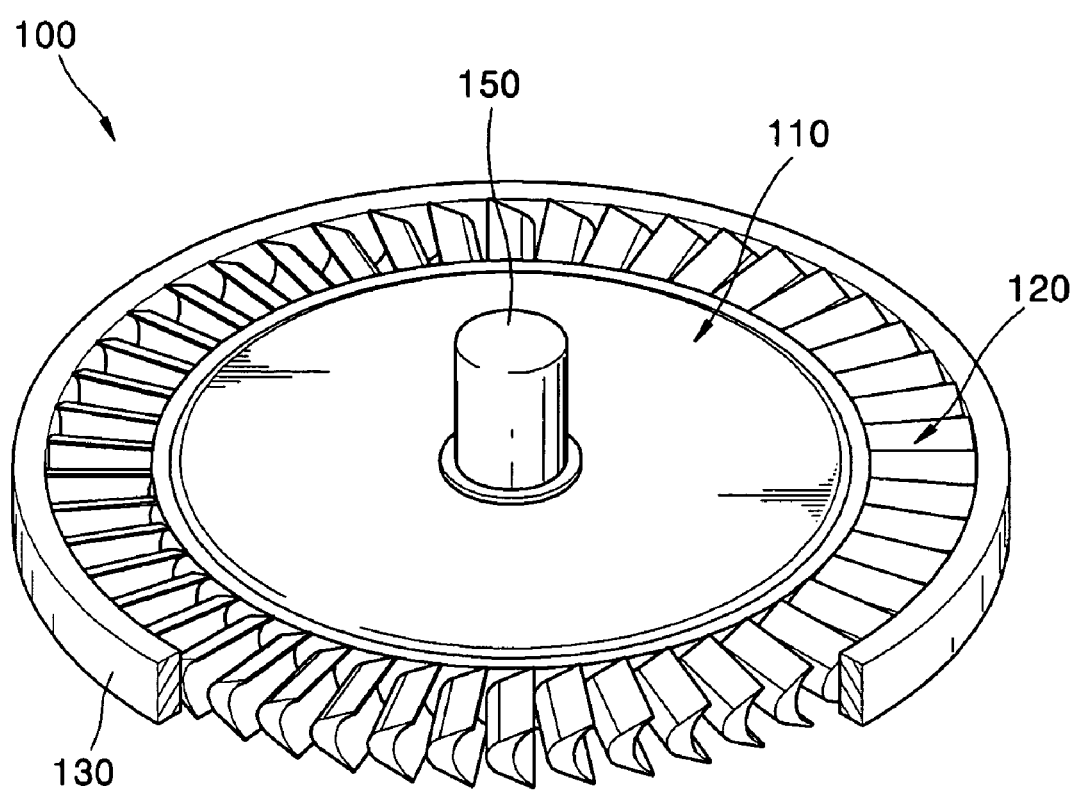
FIG. 6 is a partially cutaway view in perspective view of a turbine blade manufactured by the present invention.

FIG. 6 is a partially cutaway view in perspective view of a turbine 100 manufactured by an electric-discharge machining method of the present invention. The turbine 100 includes a disc 110 of a round plate and having a rotary shaft 150, a plurality of blades 120 spaced apart from at regular intervals along an outer circumference of the disc 110, and a shroud 130 connecting the blades 120 to form an outer circumference of the turbine 100. According to the electric-discharge machining method of the present invention, it can manufacture an integral turbine 100 with disc-blade-shroud integrally formed, as shown in FIG. 6.

Figure 7:
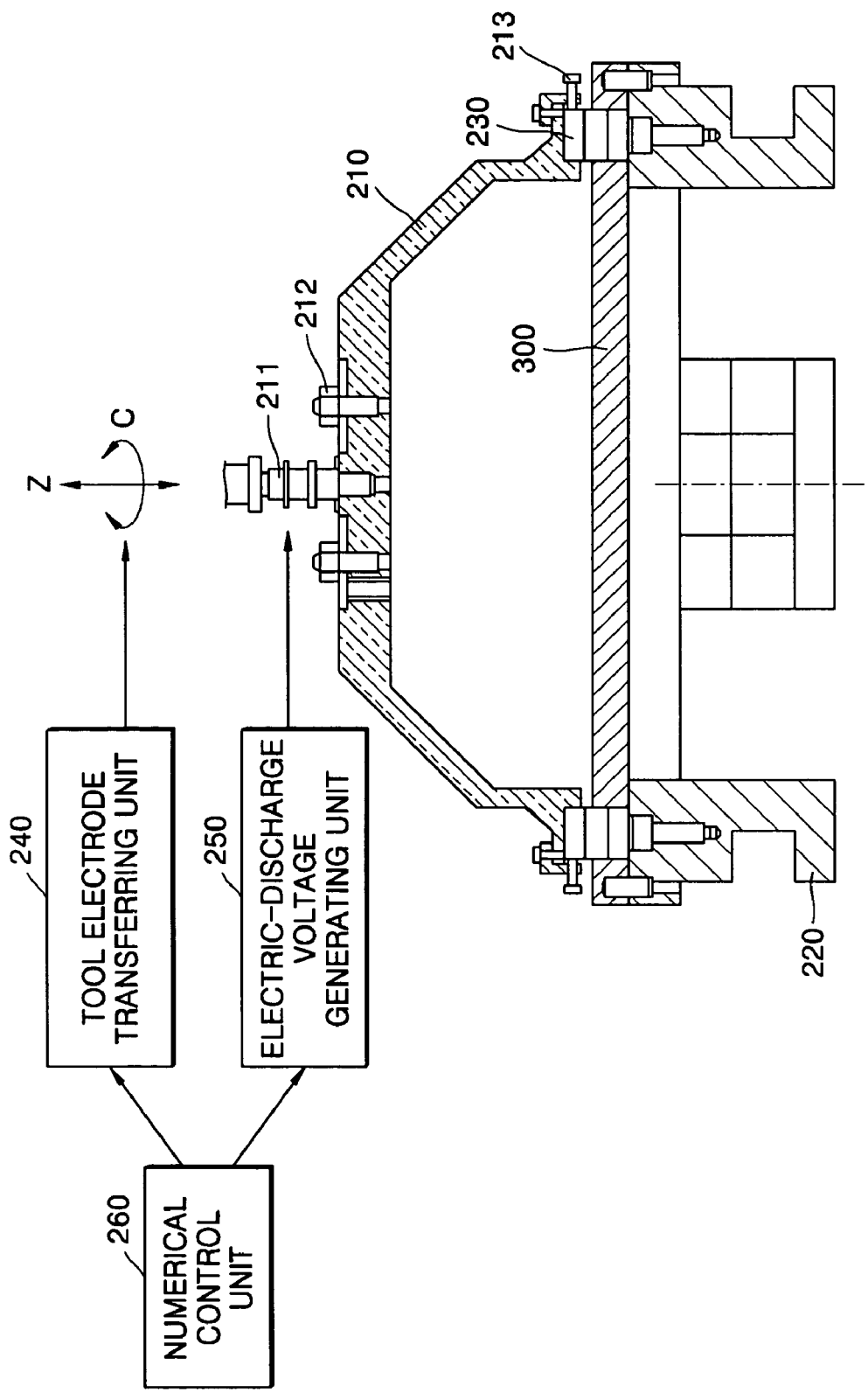
FIG. 7 is a cross-sectional view of an electric-discharge machining apparatus according to an embodiment of the present invention.

FIG. 7 shows one example of an electric-discharge machining apparatus capable of being applied to an electric-discharge machining of a turbine blade according to the present invention. The electric-discharge machining apparatus includes an electrode holder 210 and a mounting frame 220 opposed to the electrode holder. A disc material 300 which is a work piece is laid on the mounting frame 220 and is fixed between the electrode holder 210 and the mounting frame 220. The electrode holder 210 is provided at a center of the first portion thereof with a main shaft mounting portion 211. The electrode holder 210 is connected to a tool electrode transfer 240 through the main shaft mounting portion 211. The tool electrode transfer 240 transfers the electrode holder 210 to a vertical direction (Z direction) and a circumferential direction (C direction) under the control of a numerical control unit 260. To this end, the numerical control unit 260 receives information on a machining route. Tool electrodes 230 installed to the electrode holder 210 are transferred along the input machining route to machine the disc material 300. The main shaft mounting portion 211 is electrically connected to an electric-discharge voltage generating unit 250, such that a discharge pulse is applied to the tool electrodes 230. The tool electrodes 230 are fixed to the circumference of the electrode holder 210 by a mounting member 213. Reference numeral 212 denotes an attachment coupled to the tool electrode transfer 240.

Figure 8:
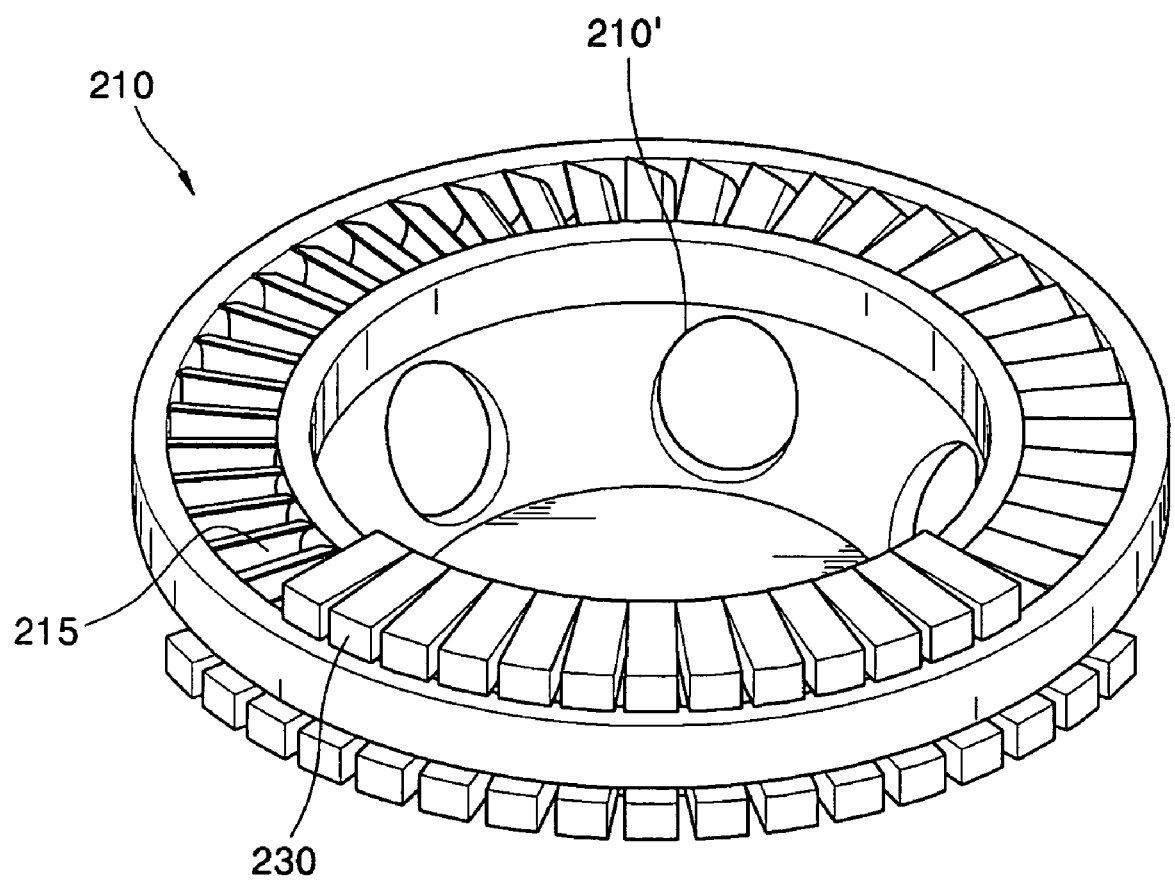
FIG. 8 is a perspective view of the electrode holder in FIG. 7.

FIG. 8 shows the electrode holder in FIG. 7, in which the electrode holder 210 is formed with a plurality of mounting grooves 215 in a circumferential direction of the electrode holder, and the tool electrodes 230 are arranged in the mounting grooves 215. The tool electrodes 230 are spaced apart from each other at a gap corresponding to a blade pitch of the turbine to be formed. The tool electrode 230 is applied with a desire level of discharge voltage through the main shaft mounting to generate the electric discharge across the electrode and the work piece. The electrode holder 210 is formed with a plurality of through-holes 210' in a radial direction, so as to make the electrode holder 210 light and improve driving efficiency of the electrode holder 210.

Figure 9A:
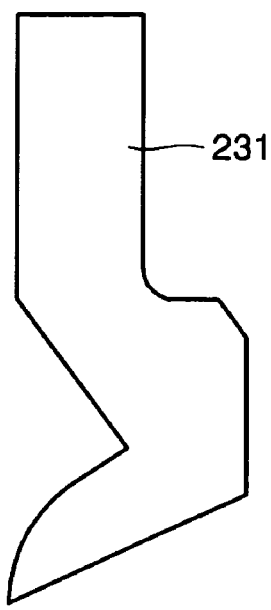
FIGS. 9A through 9C are explanatory views of a roughing tool electrode and a finishing tool electrode.
Figure 9B:
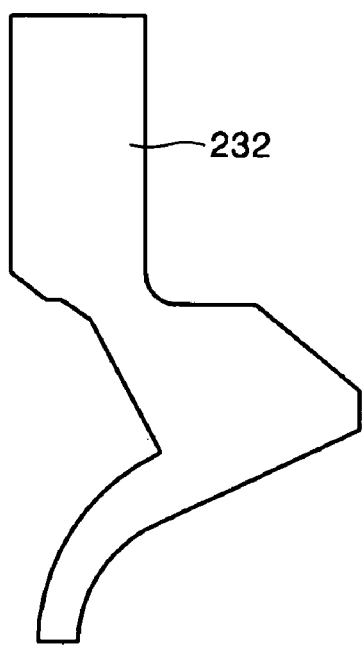
Figure 9C:
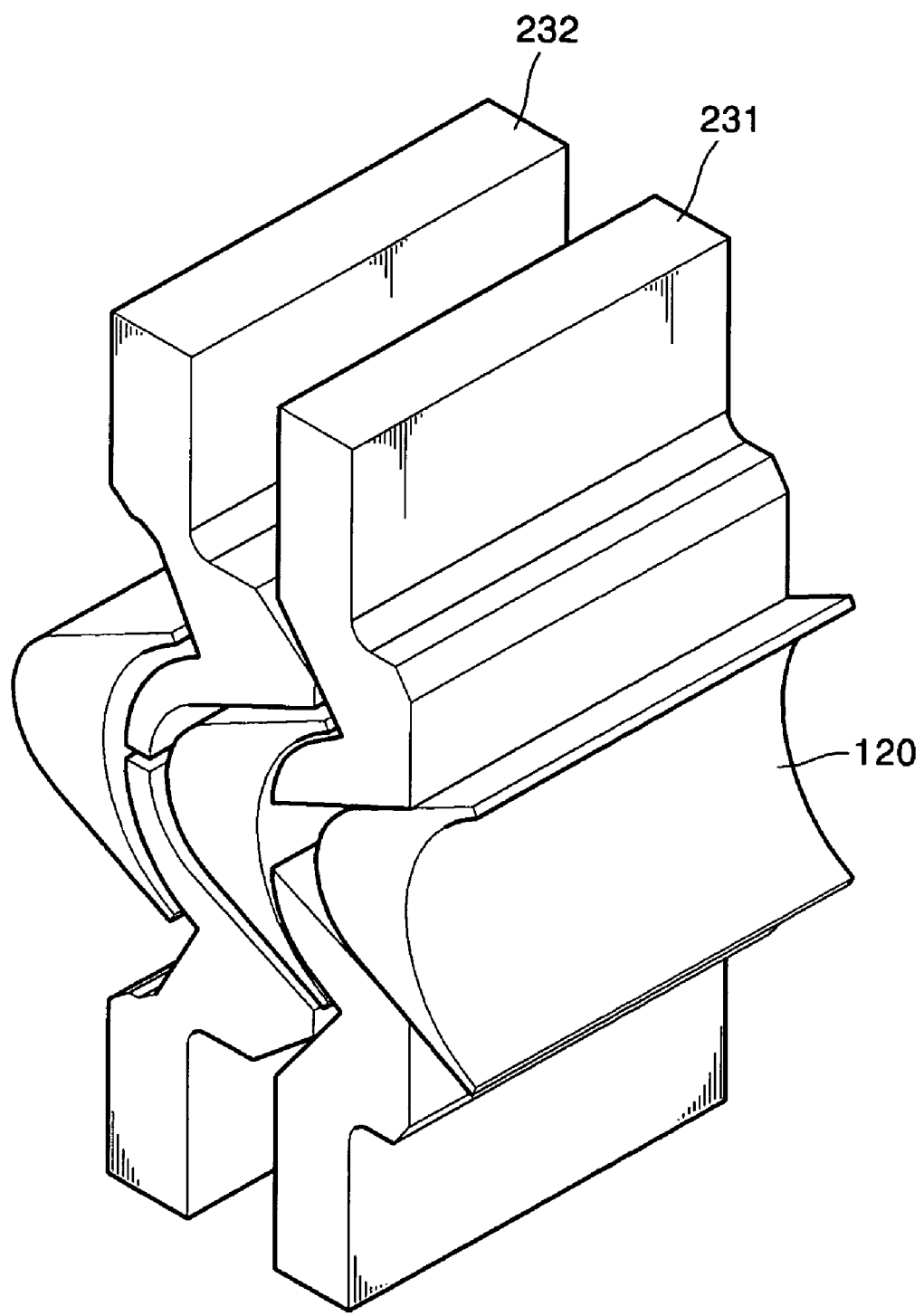

FIGS. 9A through 9C are side views of a roughing tool electrode 213 and a finishing tool electrode 232, in which the electrodes 231 and 232 are formed along a profile of the blade 120. The roughing tool electrodes 231 primarily perform shallow cutting on the disc material, thereby forming roughing spaces in which the finishing tool electrodes 232 come. The finishing tool electrodes 232 come in the disc material through the roughing space to perform deep cutting and thus complete the shape of the blade 120. The electrodes 231 and 232 may be made of, for example, an alloy of chrome and copper having high conductivity and high-temperature strength.

Figure 10:
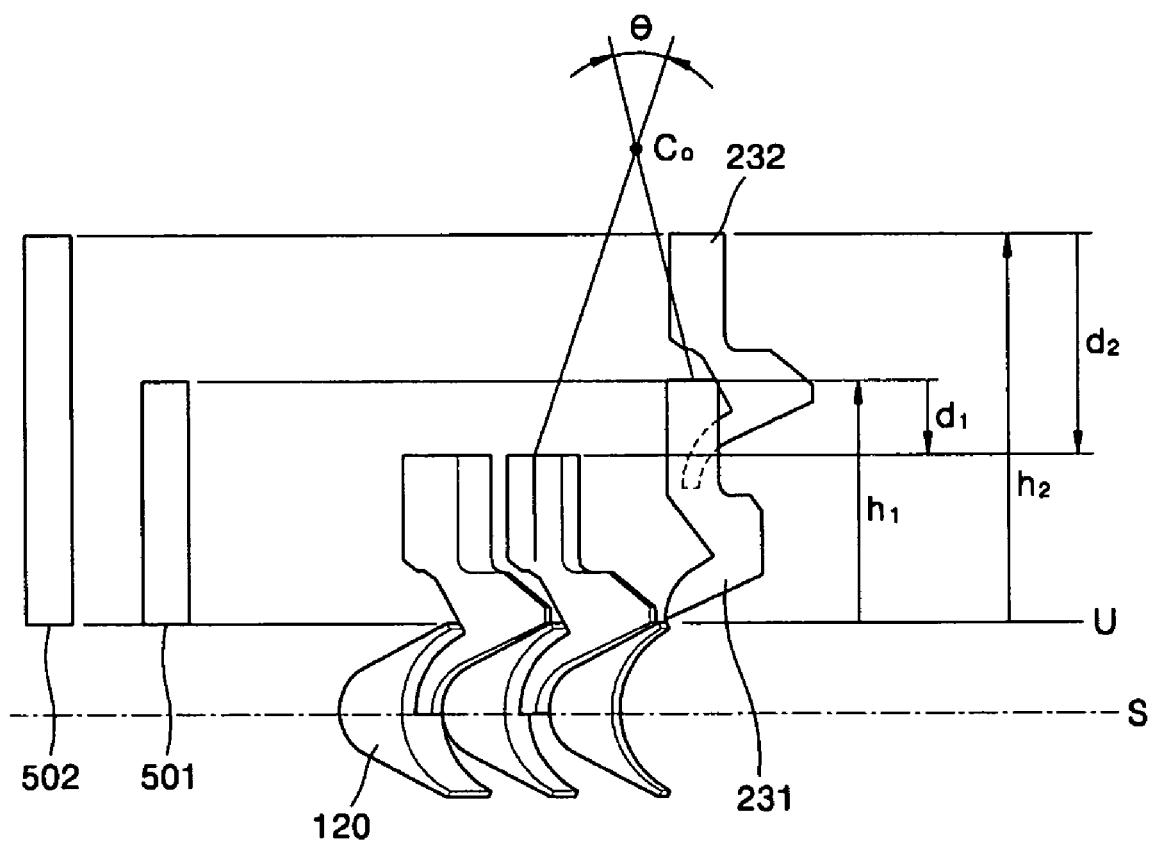
FIG. 10 is an explanatory view of reference height and lead angle of a tool electrode.

FIG. 10 shows a process of setting reference heights $h_1$ and $h_2$ to the roughing tool electrodes 231 and the finishing tool electrodes 232, after the electrodes 231 and 232 are mounted to the electrode holders. The reference heights $h_1$ and $h_2$ are measured upward from a first surface U of the disc material. The roughing tool electrodes 231 and the finishing tool electrodes 232 are transferred downward from the reference heights $h_1$ and $h_2$ so as to perform the machining. The reference heights $h_1$ and $h_2$ are differently set depending upon the roughing machining and finishing machining. For easy setting, after a roughing setting block 501 and a finishing setting block 502 are put on the disc material, the roughing reference height $h_1$ and finishing reference height $h_2$ may be set on the basis of heights of the blocks. Reference numerals $d_1$ and $d_2$ denote a roughing depth and finishing depth, when the roughing machining and the finishing machining have been completed, respectively. The depths $d_1$ and $d_2$ are measured downward from the reference heights $h_1$ and $h_2$. The information on the depths $d_1$ and $d_2$ are previously inputted into the electrical discharge machining apparatus, respectively. If the tool electrodes 231 and 232 reach to the depths $d_1$ and $d_2$, the electric-discharge machining is completed. For example, in the finishing discharge, the finishing tool electrode 232 is rotated by an angle of $\theta$ on a center of a rotary axis $C_o$, and simultaneously, is moved downward from the reference height $h_2$ by the depth $d_2$, thereby completing the finishing. The blade 120 is machined through these transferring processes.

A process of electric discharging the turbine blade according an embodiment of the present invention will now be described in detail.

Figure 11A:
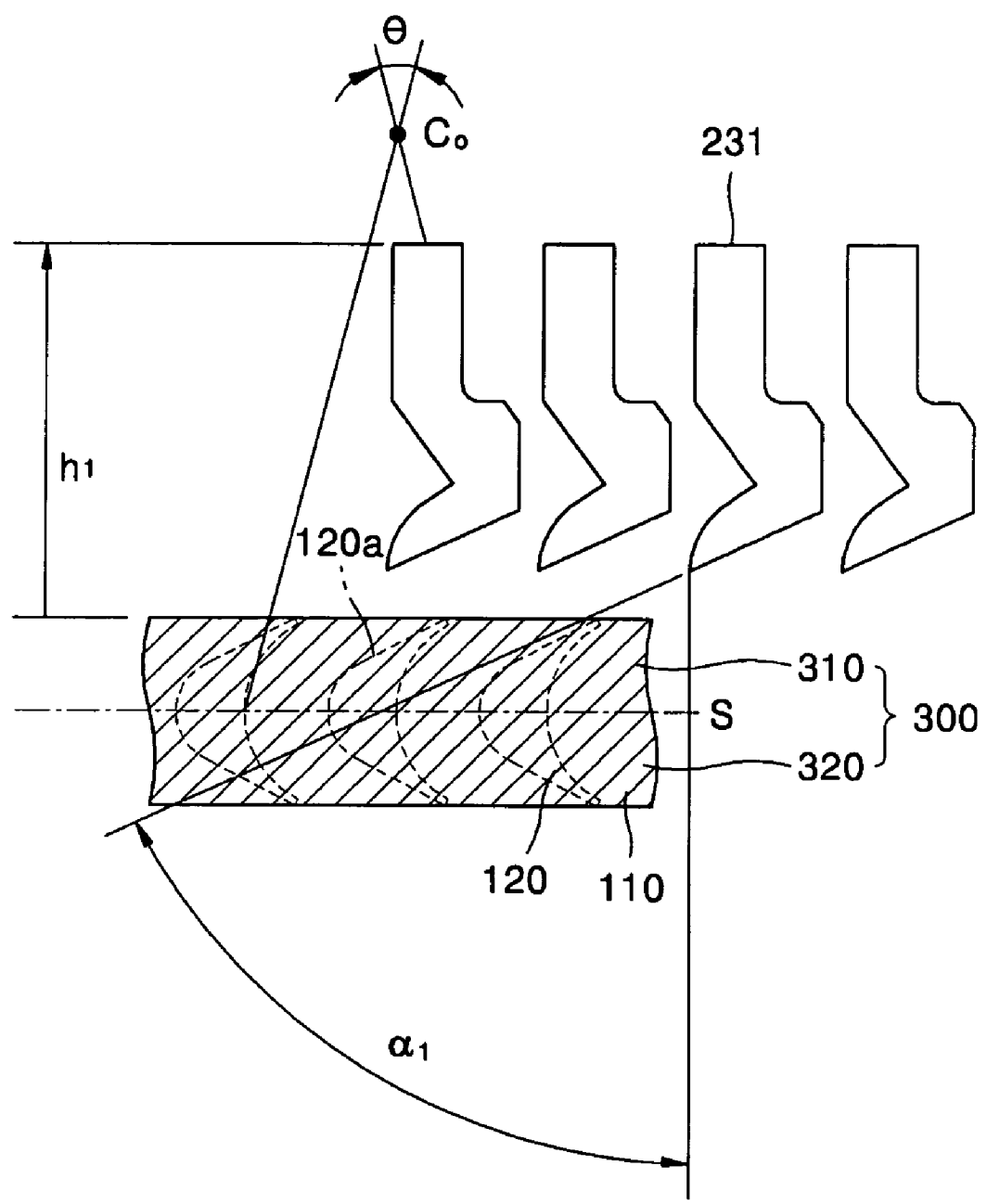
FIGS. 11A through 11D are views illustrating an order of an first roughing process.

As shown in FIG. 11A, a disc material 300 is prepared, and is then fixed to the electric-discharge machining apparatus. For reference, the apparatus for electric-discharge machining the turbine according to the present invention performs the electric-discharge machining the disc material 300 by dividing a first portion 310 and the second portion on the basis of a symmetrical line. After the disc material is mounted, at least two roughing tool electrodes 231 are installed to the electrode holder. Preferably, the number of the roughing tool electrodes 231 to be installed corresponds to the number of the blades to be formed, such that each of the blades 120 may be concurrently machined by each roughing tool electrodes 231. If a number of blades 120 are concurrently formed along the circumference of the disc material, the machining time is shortened, and a repeated process is omitted. In addition, a setting error attained through many times is eliminated, thereby improving the precision of the machining.

After the tool electrodes 231 are installed to the electrode holder, the reference height $h_1$ of the roughing tool electrode is set, which is described above with reference to FIG. 10. Next, the information on the machining route of the tool electrode is inputted into the electric-discharge machining apparatus, in which the information on a roughing lead angle $\alpha_1$ is inputted in the roughing machining. The lead angle $\alpha_1$ means a transfer angle of the tool electrode 231, as shown in FIG. 11A, which is defined as an angle relative to a vertical axis of the disc material 300. At that time, the lead angle $\alpha_1$ may be set at a desired angle between from 0° to 90° according to an angle of an inclined portion 120a of the turbine blade to be formed. The tool electrode 231 is concurrently controlled in the circumferential and vertical directions to move along the desired lead angle $\alpha_1$, as described hereinafter.

Figure 11B:
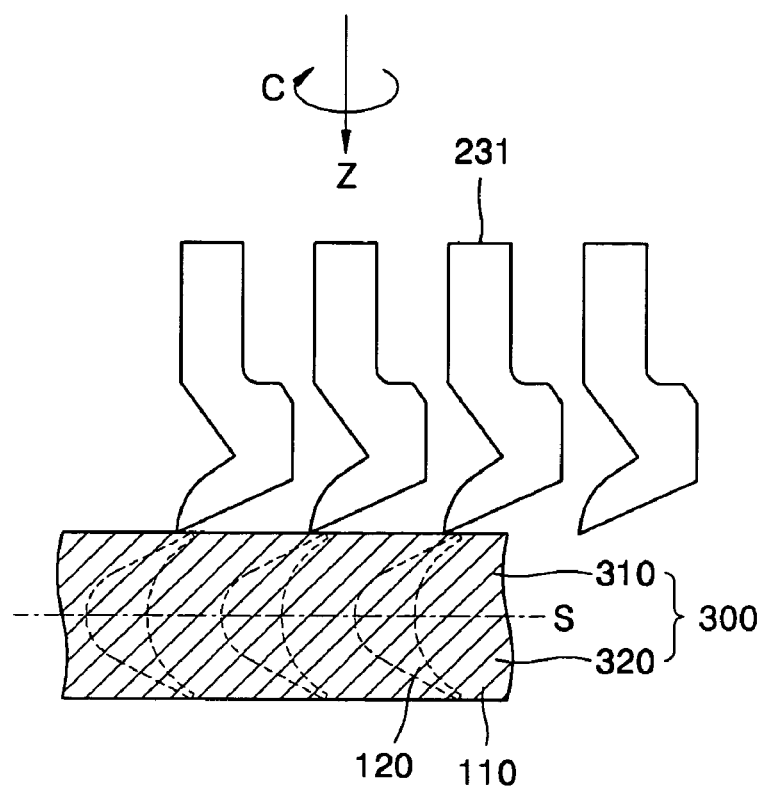
Figure 11C:
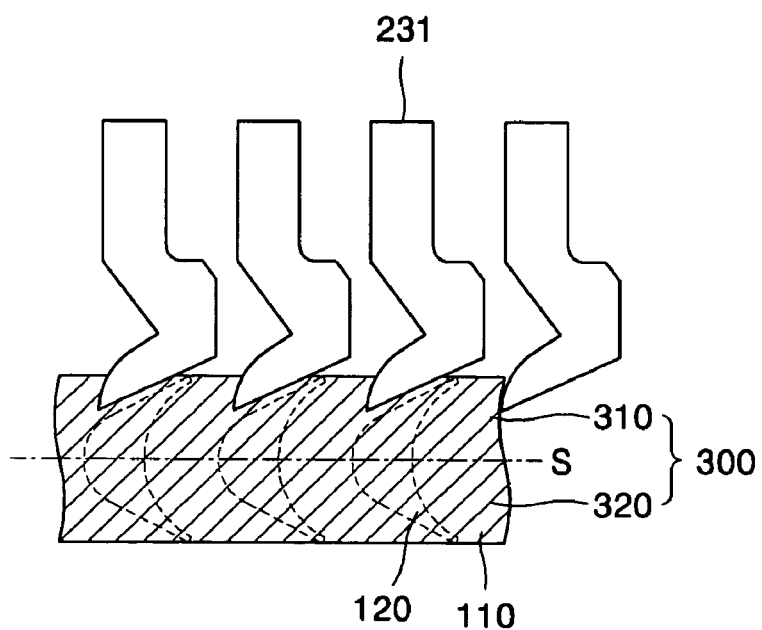
Figure 11D:
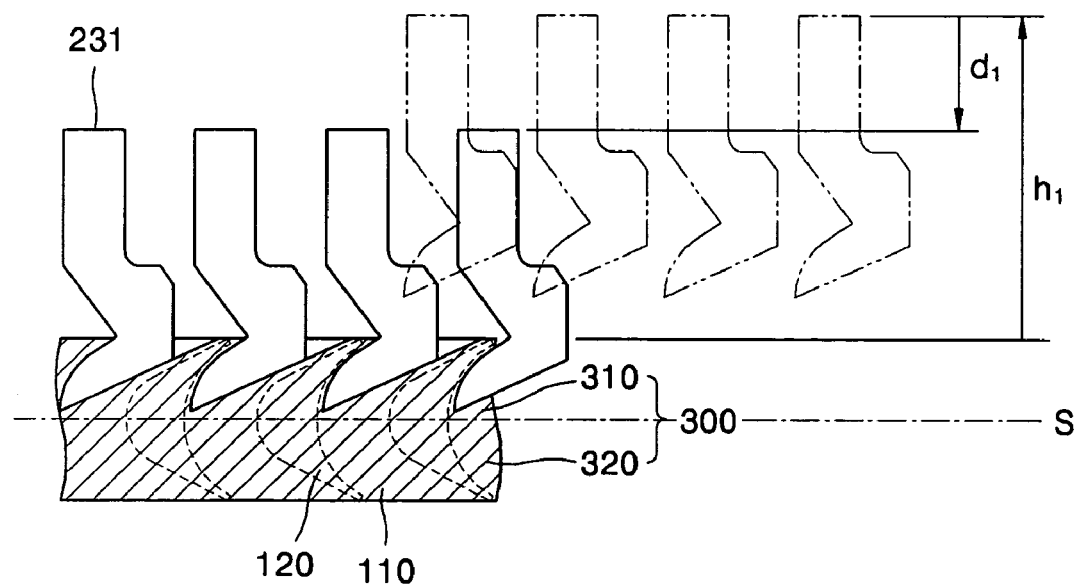
Figure 12:
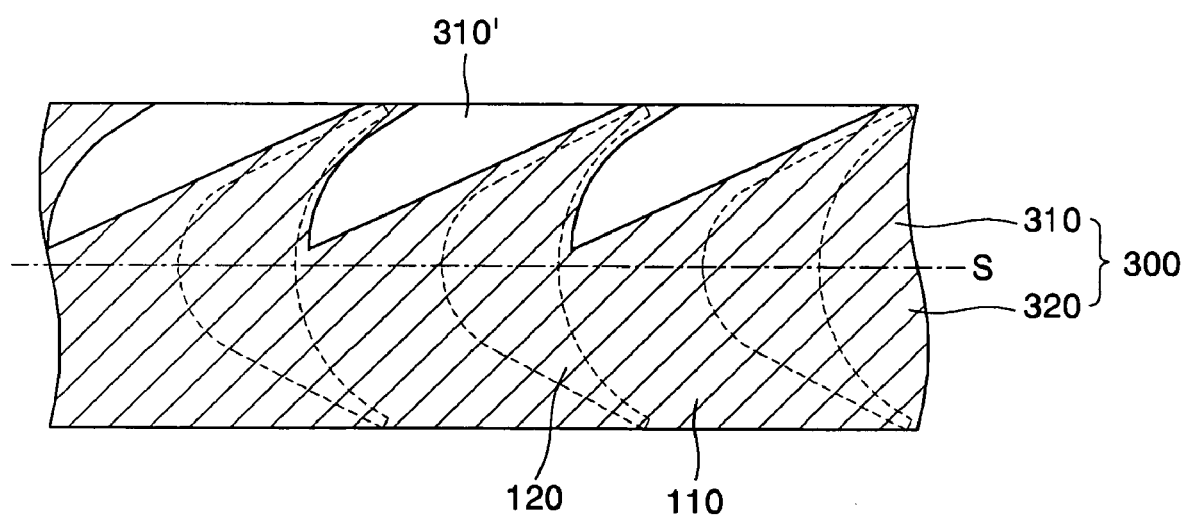
FIG. 12 is a cross-sectional view illustrating a shape of a disc material formed through an first roughing process.

Next, as shown in FIGS. 11B through 11D, the roughing tool electrode 231 moves at the input lead angle to perform the electric machining. The electrode holder 210 is concurrently controlled at the vertical direction (Z direction) and circumferential direction (C direction) of the disc material, so that the roughing tool electrode 231 is moved along the desired lead angle. The roughing process progresses until the tool electrode 231 reaches by the roughing depth $d_1$ which is previously inputted, as shown in FIG. 11D. The first portion 310 of the disk material 300 is formed with a desired roughing space 310' through the roughing process, as shown in FIG. 12. The finishing tool electrodes are led into the roughing space 310' to perform the finishing machining.

Figure 13A:
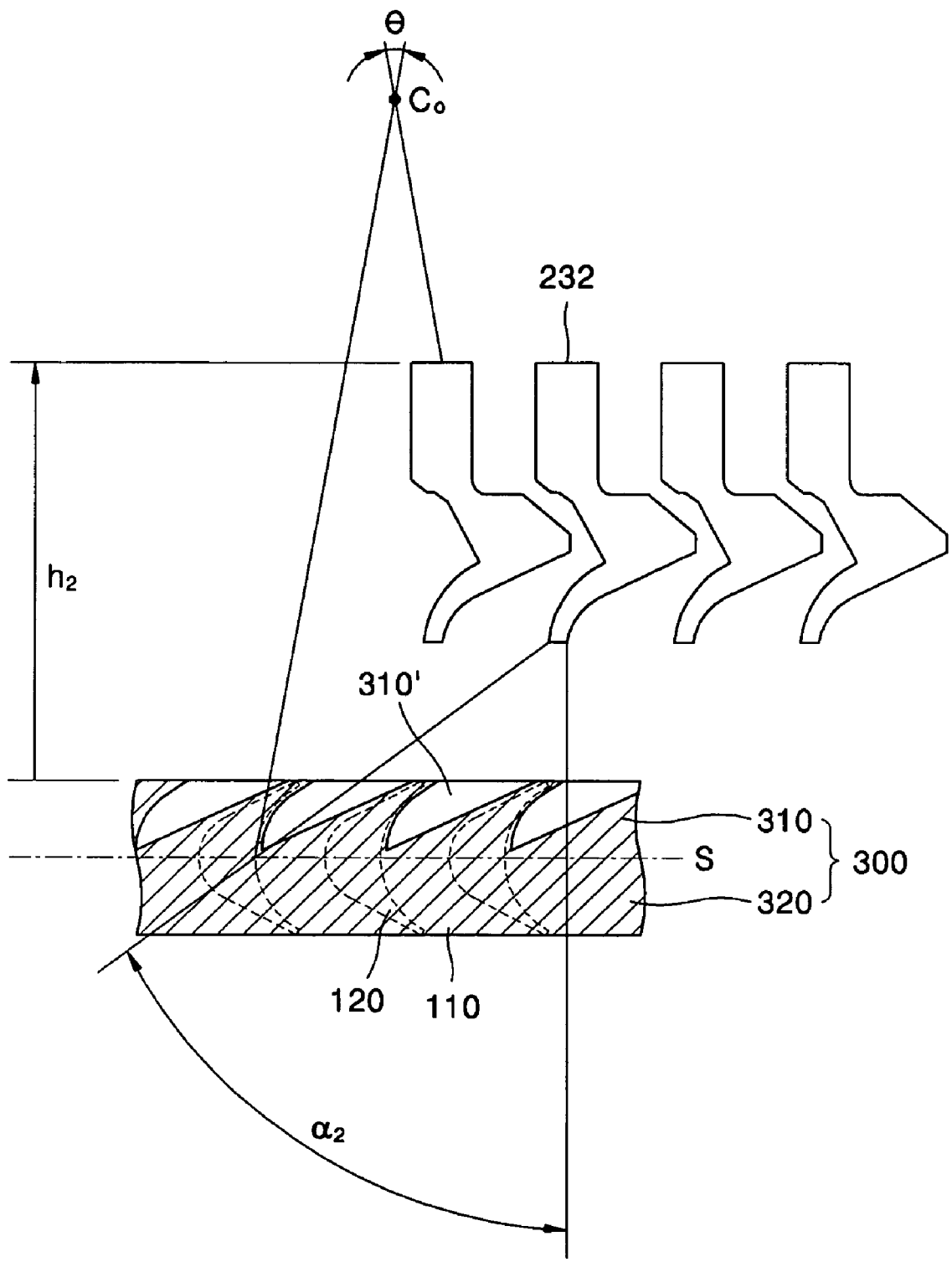
FIGS. 13A through 13G are views illustrating an order of an first finishing process.
Figure 13B:
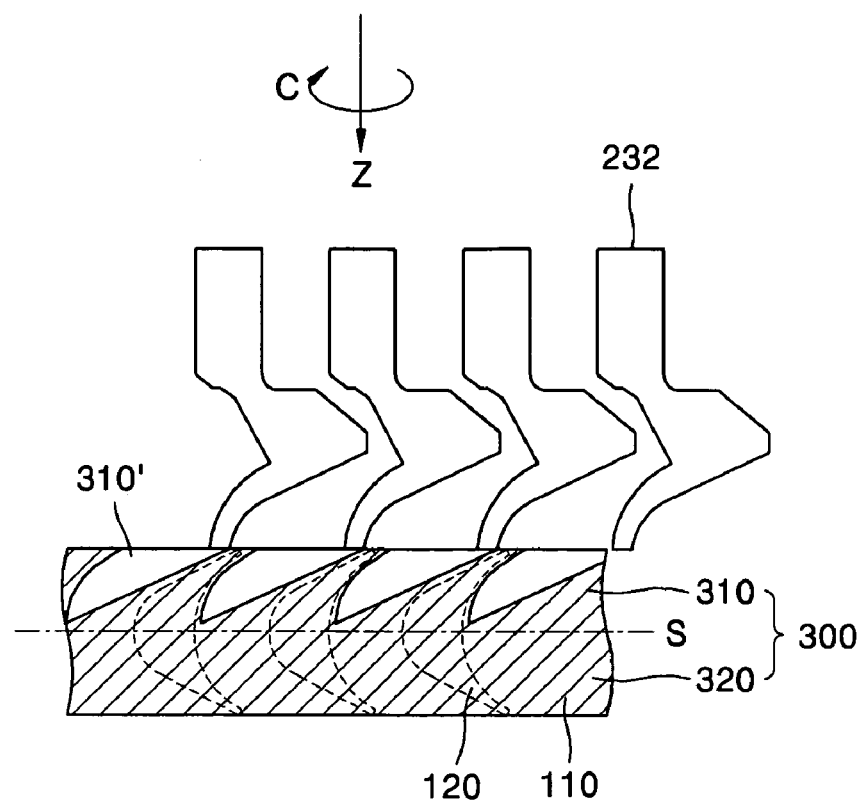
Figure 13C:
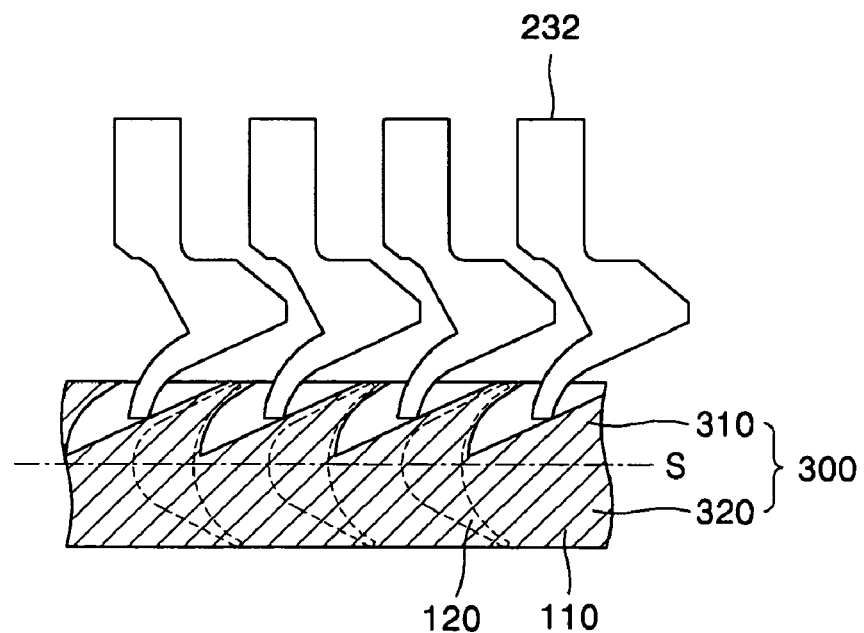
Figure 13D:
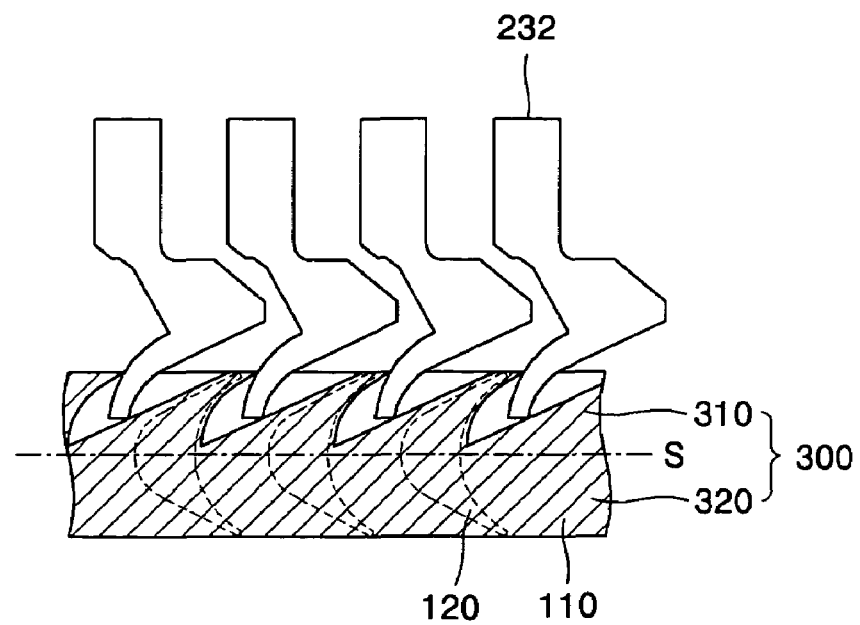

Referring to FIG. 13A, the rouging electrodes installed to the electrode holder is replaced with the finishing tool electrode 232, and the information on the finishing reference height $h_2$ is inputted into the electric-discharge machining apparatus. At that time, the finishing reference height $h_2$ may be set as described hereinafter with reference to FIG. 10. Then, the information on a finishing lead angle $\alpha_2$ in the first finishing process and a circumferentially transfer amount $\phi_1$ (FIG. 13F) in the second finishing process are inputted into the electric-discharge machining apparatus. The lead angle $\alpha_2$ is set as a sharp angle relative to the roughing lead angle $\alpha_1$, as shown in FIGS. 11A and 13A, to perform the electric-discharge machining of the work piece by the tool electrode lead into the roughing space.

Figure 13E:
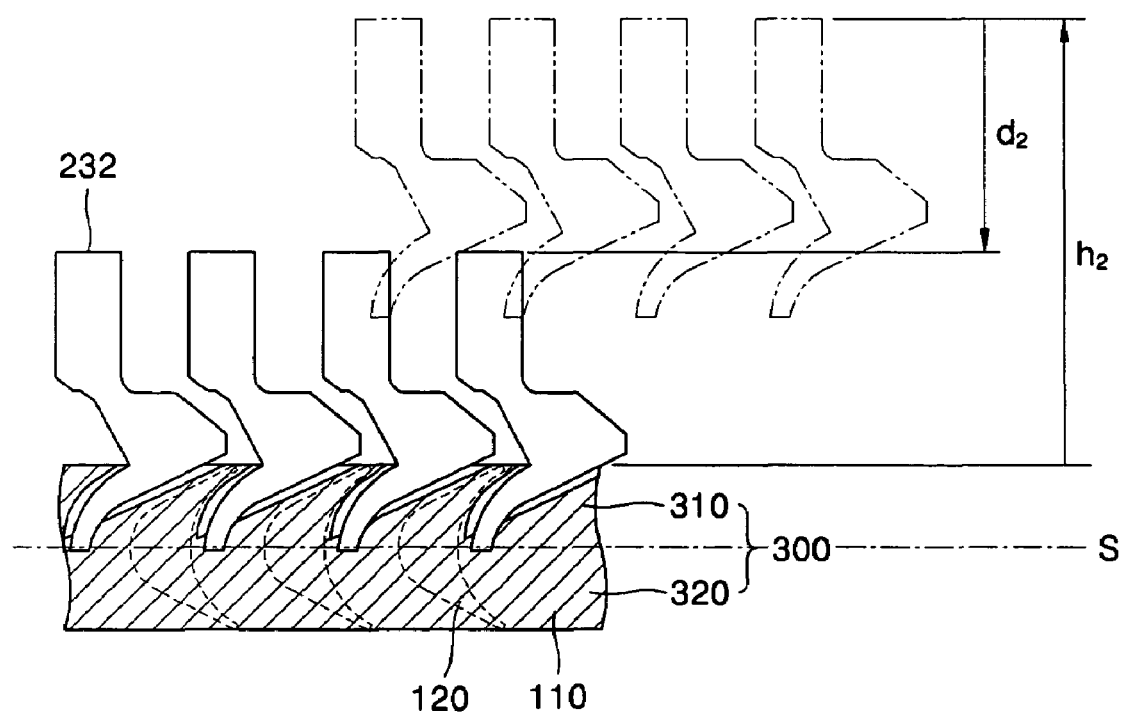

And, the first finishing electric-discharge machining is performed, as shown in FIGS. 13B through 13E. The finishing tool electrode 232 moves at the set lead angle $\alpha_2$ to perform the electric machining. The electrode holder to which the finishing tool electrode 232 is installed is concurrently controlled at the vertical direction (Z direction) and circumferential direction (C direction) of the disc material, so that the finishing tool electrode 232 is moved along the desired lead angle. The first finishing process progresses until the finishing electrode 232 reaches by the roughing depth $d_2$ which is previously inputted, as shown in FIG. 13E, and then it processes to the second finishing process.

Figure 1:
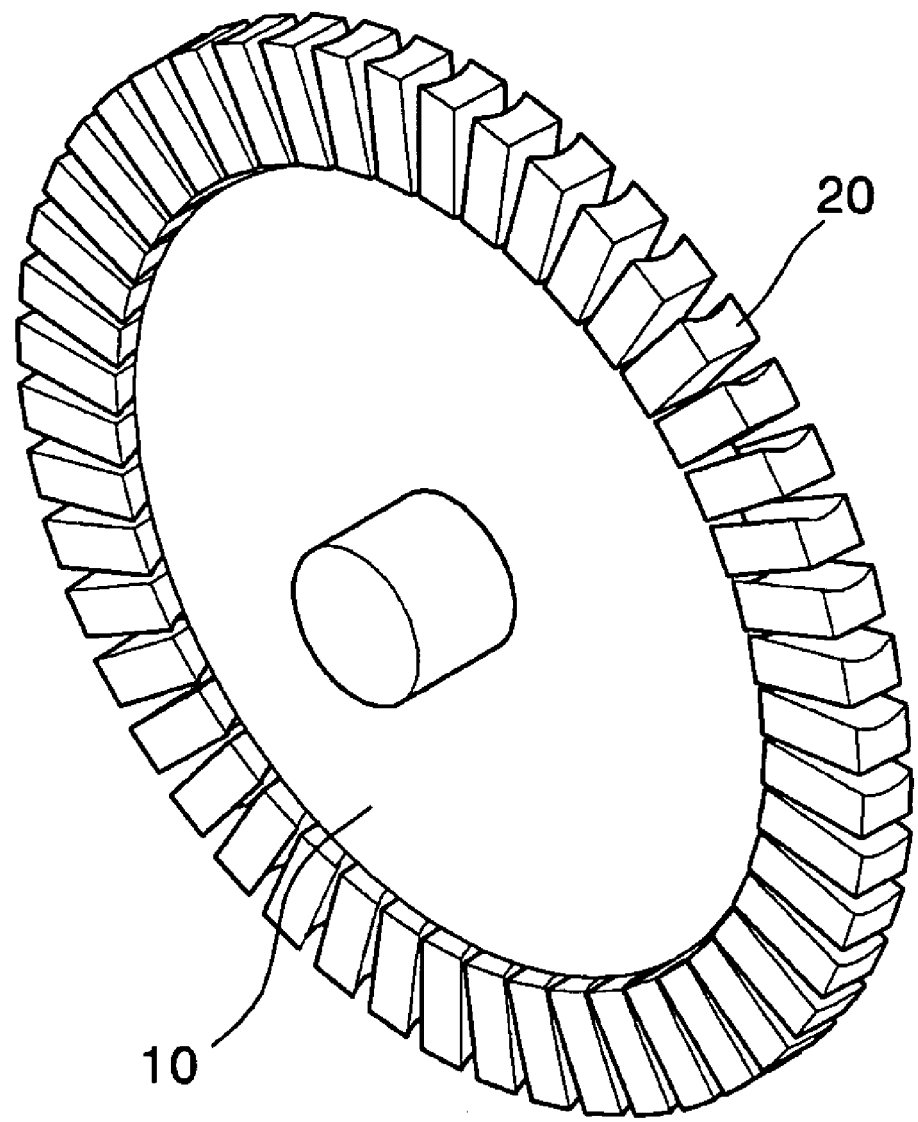
FIG. 1 is a perspective view illustrating a turbine blade manufactured by a conventional method.
Figure 2:
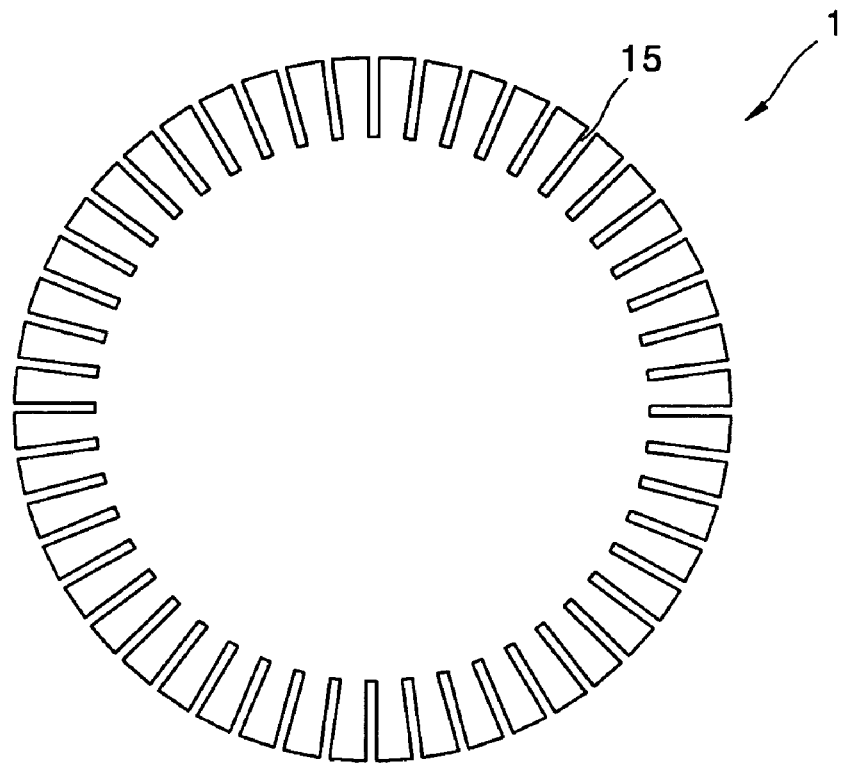
FIGS. 2 and 3 are explanatory views illustrating a conventional electric-discharge machining method.
Figure 3:
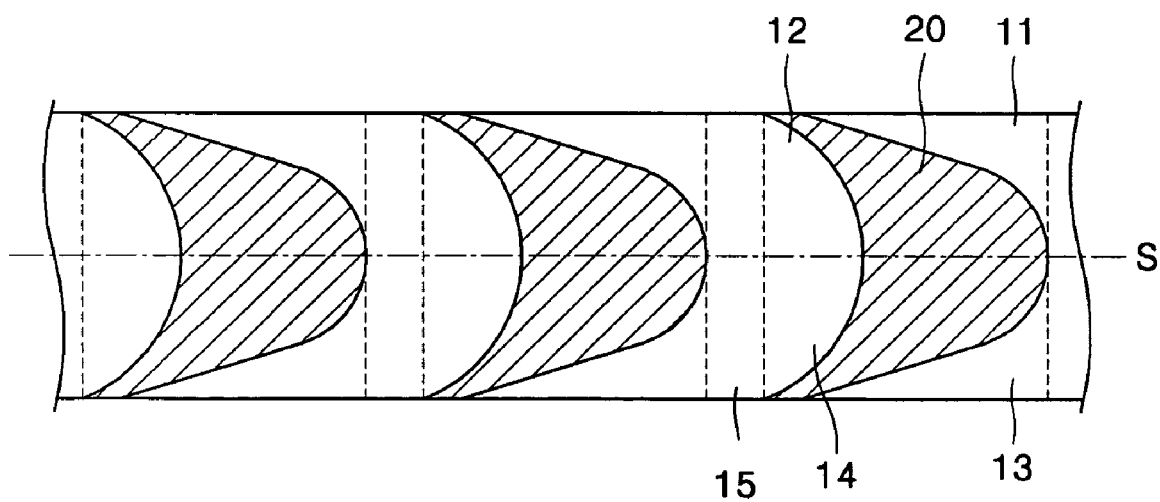
Figure 4A:
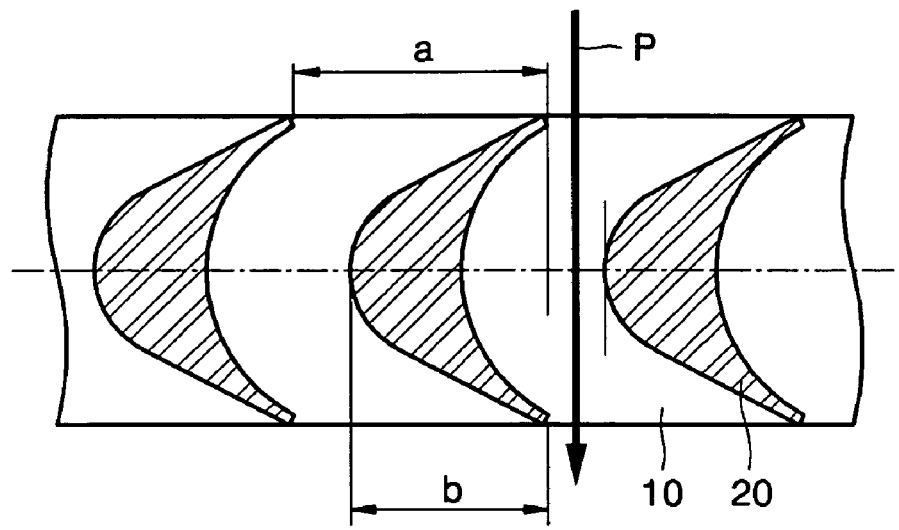
FIGS. 4A and 4B are explanatory views illustrating limitations of a conventional machining.
Figure 4B:
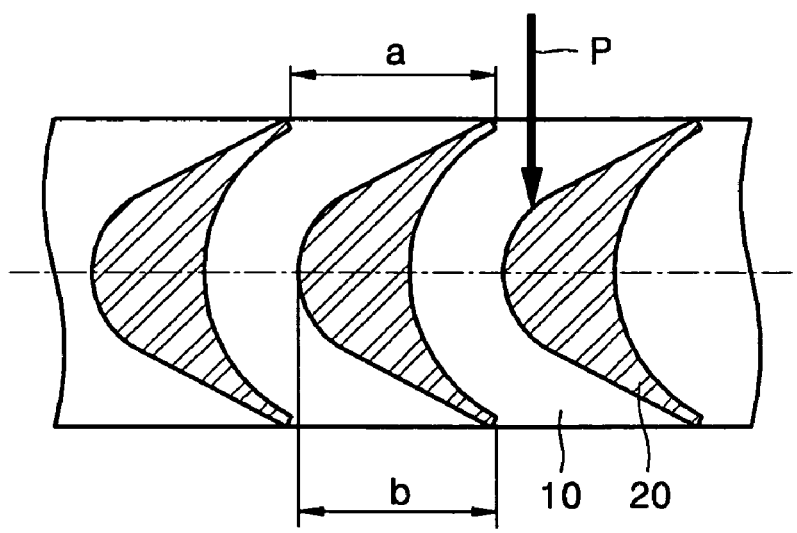
Figure 5:
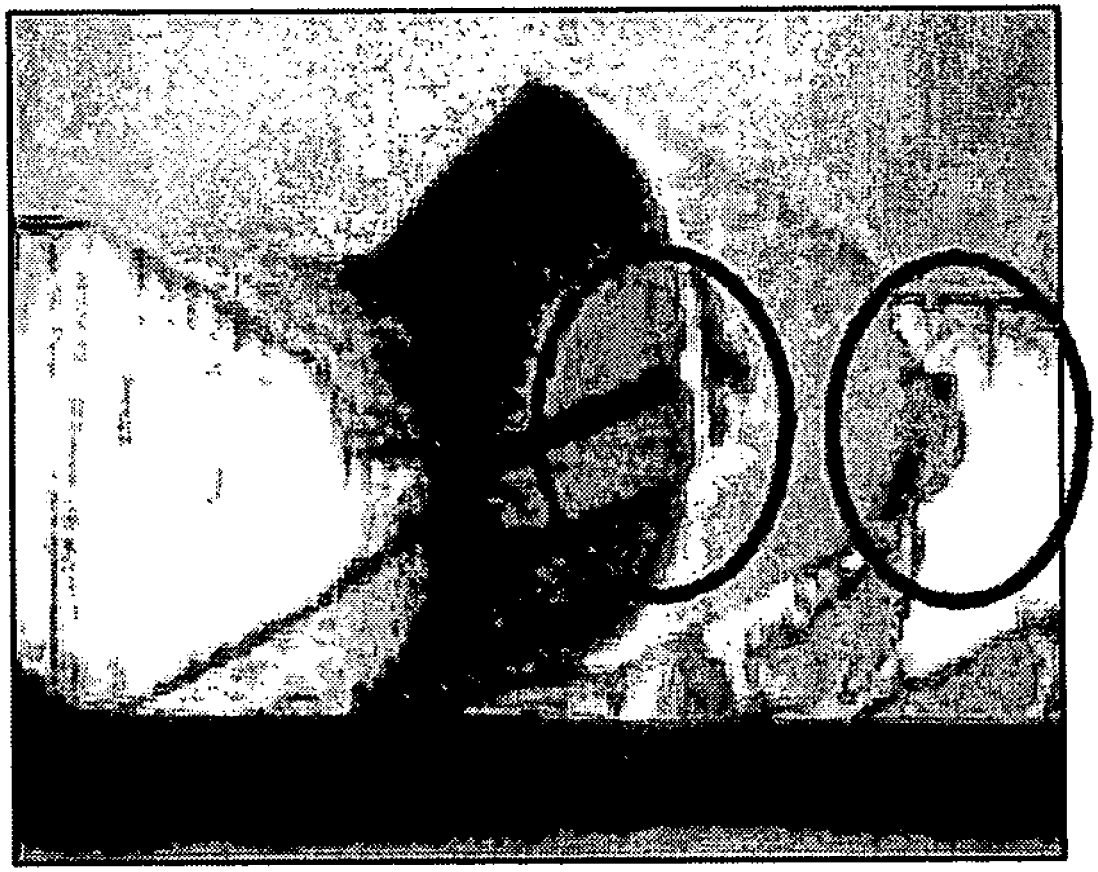
FIG. 5 is a photograph illustrating a mismatch state of a turbine blade manufactured by a conventional electric-discharge machining method.
Figure 13F:
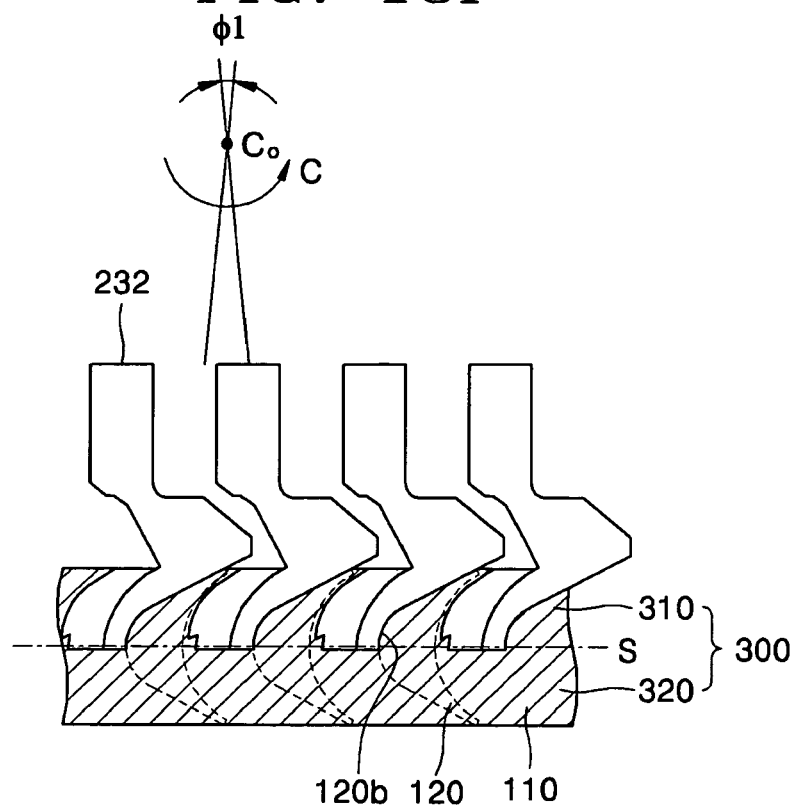
Figure 13G:
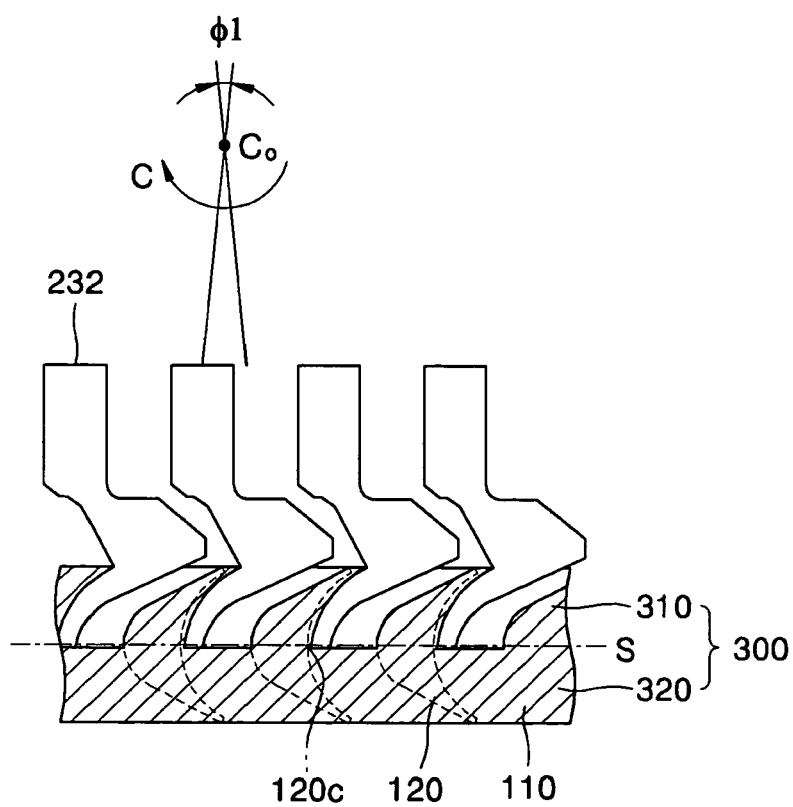
Figure 14:
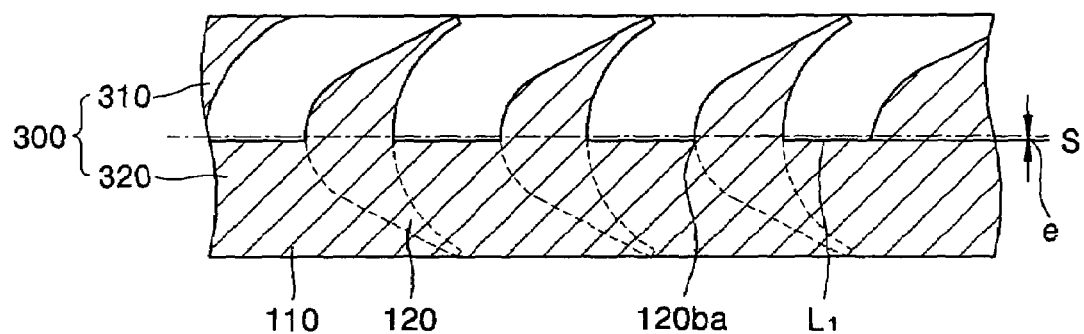
FIG. 14 is a cross-sectional view illustrating a shape of a disc material formed through an first finishing process.

In the second finishing process, the finishing tool electrode 232 is secured in a vertical direction, as shown in FIGS. 13F and 13G, while reciprocates by the set transfer amount $\phi_1$ in the circumferential direction (C direction) to form a convex portion and a concave portion. More specifically, the finishing tool electrode 232 is moved in the circumferential direction (C direction), as shown in FIG. 13F, to form a convex portion 120b of the blade. Then, the finishing tool electrode 232 is moved in the reverse circumferential direction (C direction), as shown in FIG. 13G, to form a concave portion 120c of the blade. The transfer of the finishing tool electrode 232 is performed by fixing the electrode holder in the vertical direction (Z direction) and reciprocating the electrode holder in the circumferential direction (C direction) under the control of the numerical control unit. The first portion 310 of the disc material is machined through the finishing process, as shown in FIG. 14. Preferably, a second end $L_1$ of the first machining portion is formed as deep as a tolerance e relative to the symmetrical line S. Preferably, the tolerance is in a range from 0.1 mm to 0.3 mm. As a result, the first and second portions 310, 320 of the disc material 300 are overlaid and machined, thereby eliminating the mismatch between the first and second portions 310, 320 (see FIG. 5).

Following the machining of the first portion 310 of the disc material, it proceeds to the machining process of the second portion 320 of the disc material.

Figure 15A:
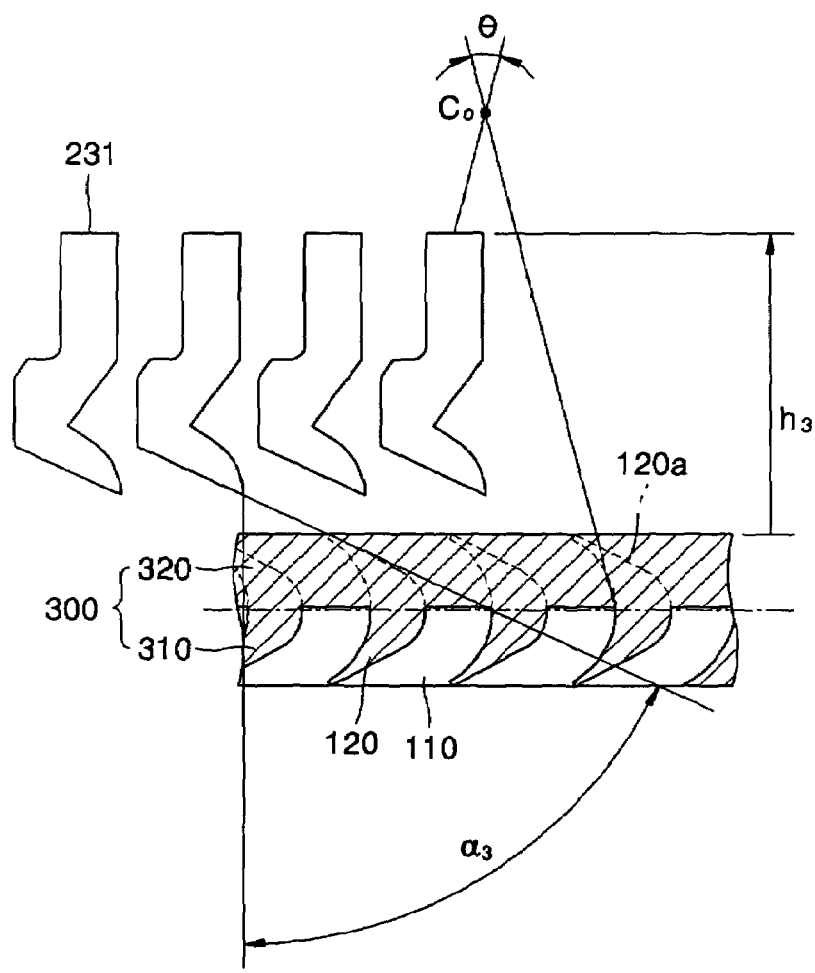
FIGS. 15A through 15D are views illustrating an order of a second roughing process.
Figure 15B:
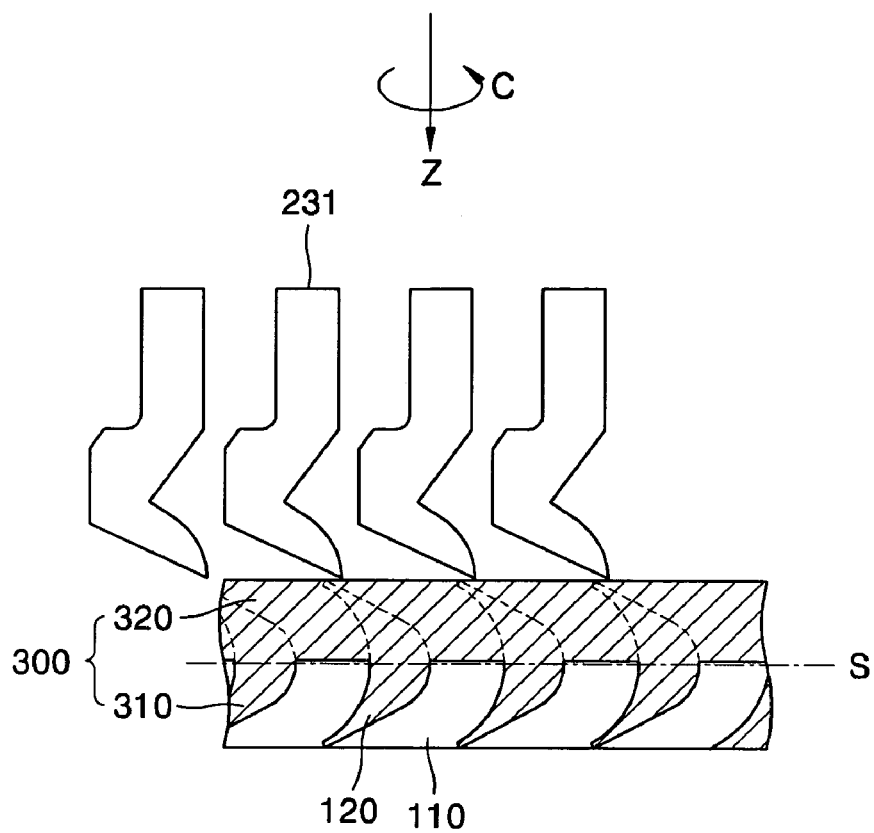
Figure 15C:
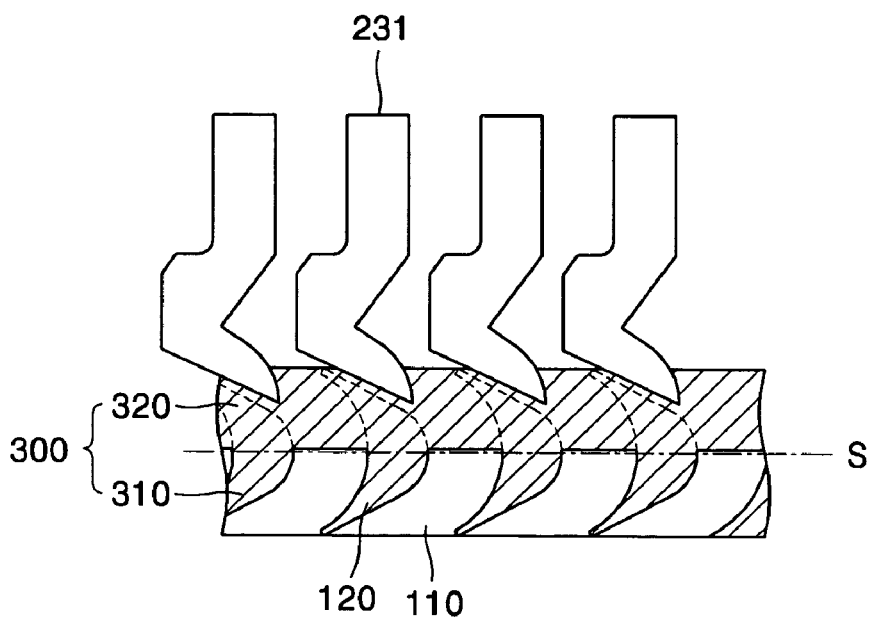
Figure 15D:
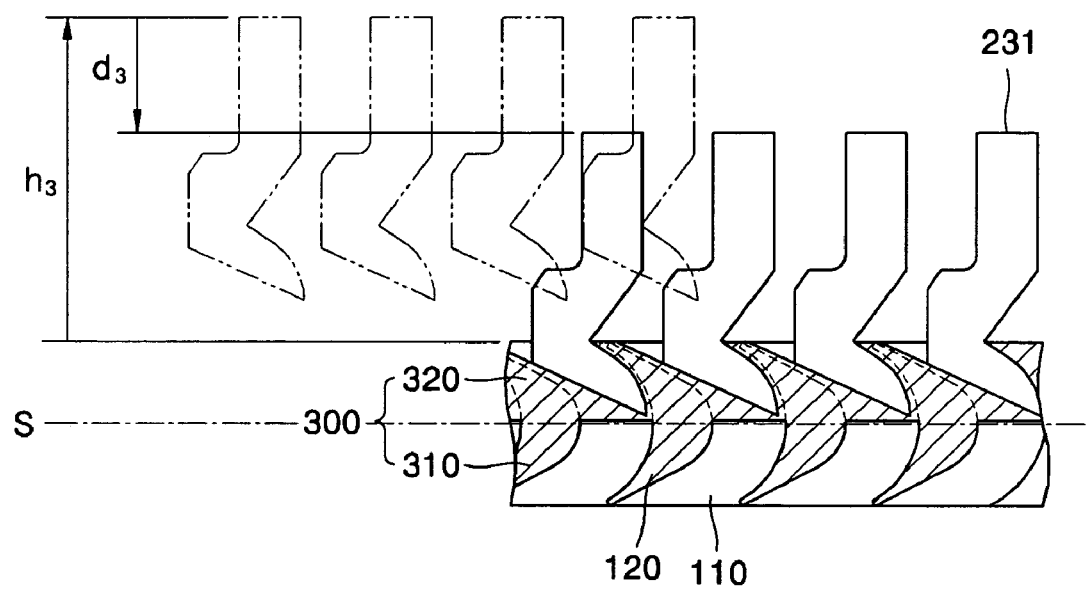
Figure 16:
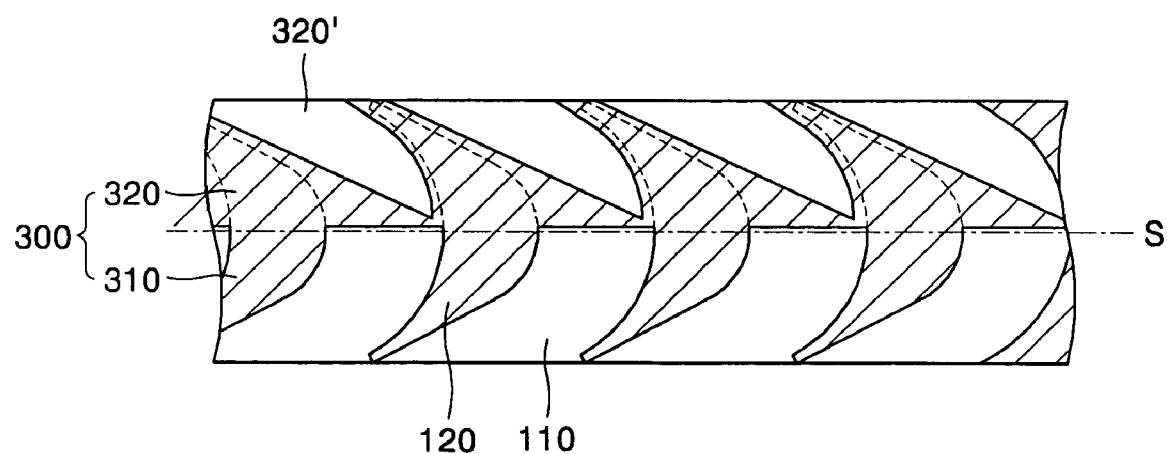
FIG. 16 is a cross-sectional view illustrating a shape of a disc material formed through a second roughing process.

As shown in FIG. 15A, the disk material is turned over and fixed to the mounting frame, with the first portion 320 facing upward. The roughing tool electrodes 231 are installed to the electrode holder, and information on the reference height $h_3$ and lead angle $\alpha_3$ is inputted into the electric discharging machining apparatus. It is noted that the reference height $h_3$ and lead angle $\alpha_3$ are set identically with the machining of the first portion 310. Next, the roughing process starts according to the input information. As shown in FIGS. 15B through 15D, the roughing tool electrodes 231 lead in the disc material 300 at the lead angle to perform the electric machining. The roughing process progresses until the tool electrode 231 reaches by the set roughing depth $d_3$, as shown in FIG. 15D. The second portion 320 of the disk material is formed with a desired roughing space 310' through the roughing process, as shown in FIG. 16.

Figure 17A:
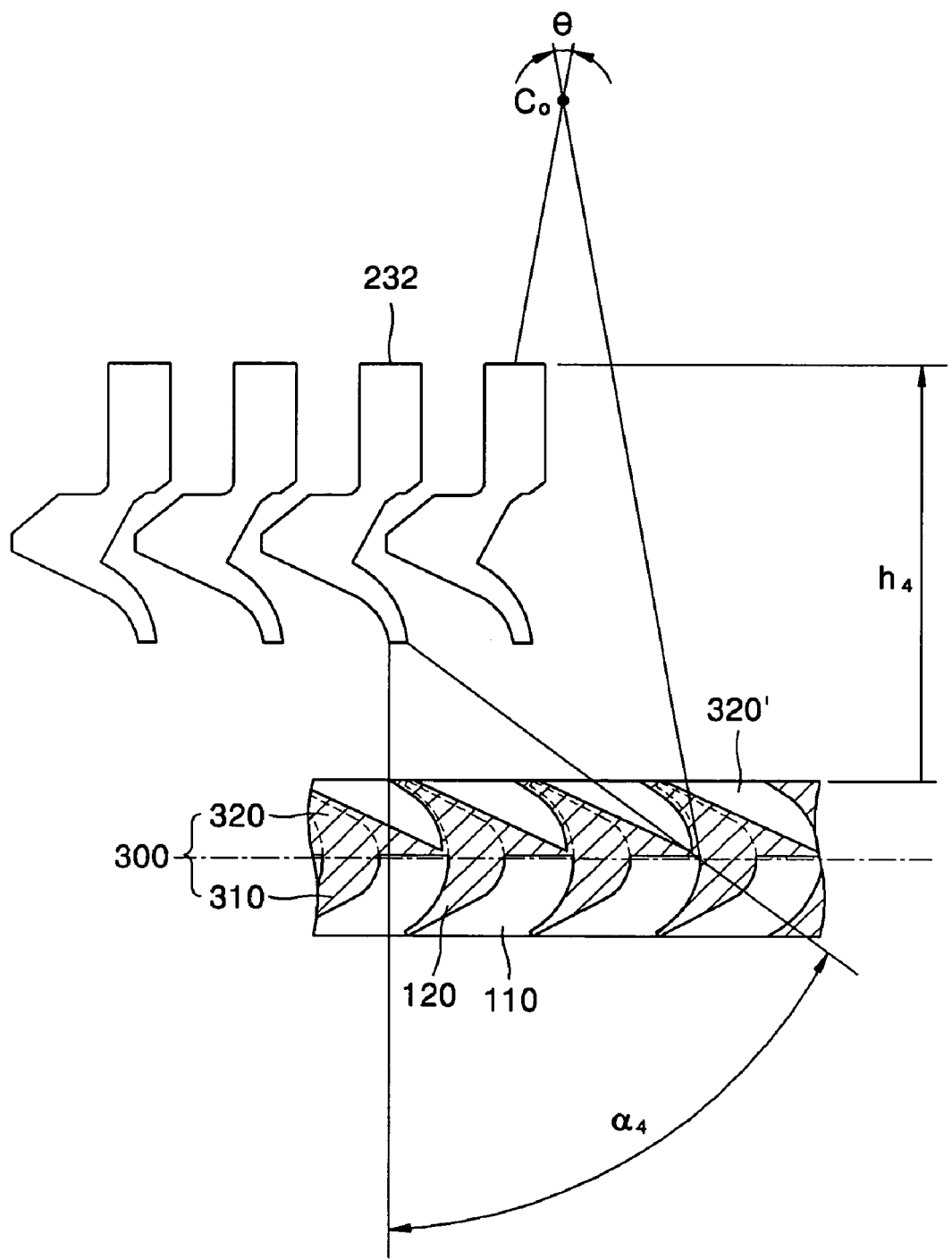
FIGS. 17A through 17G are views illustrating an order of a second finishing process.
Figure 17B:
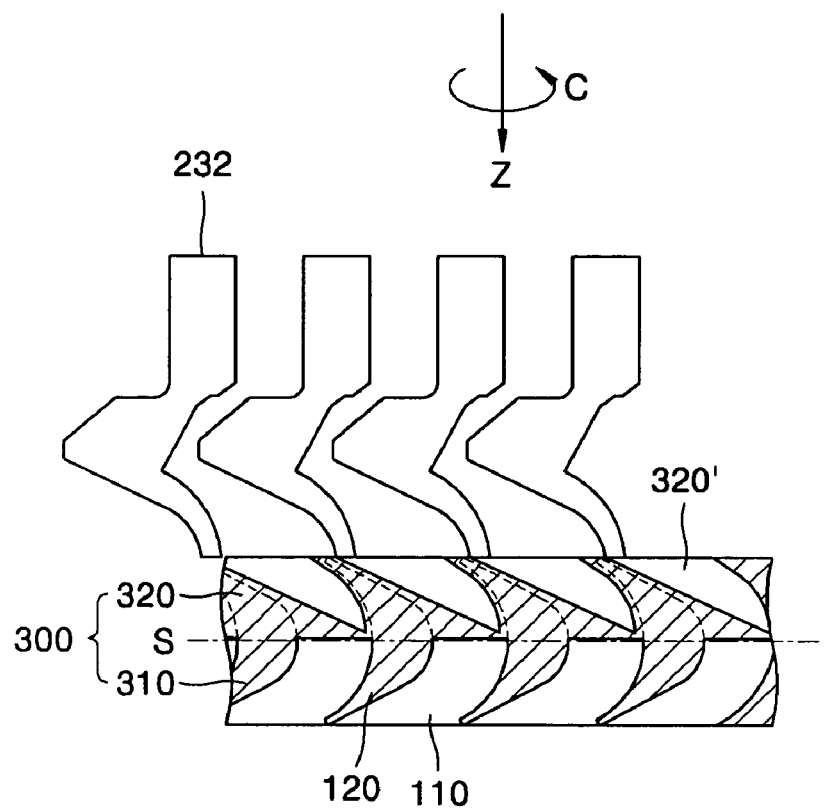
Figure 17C:
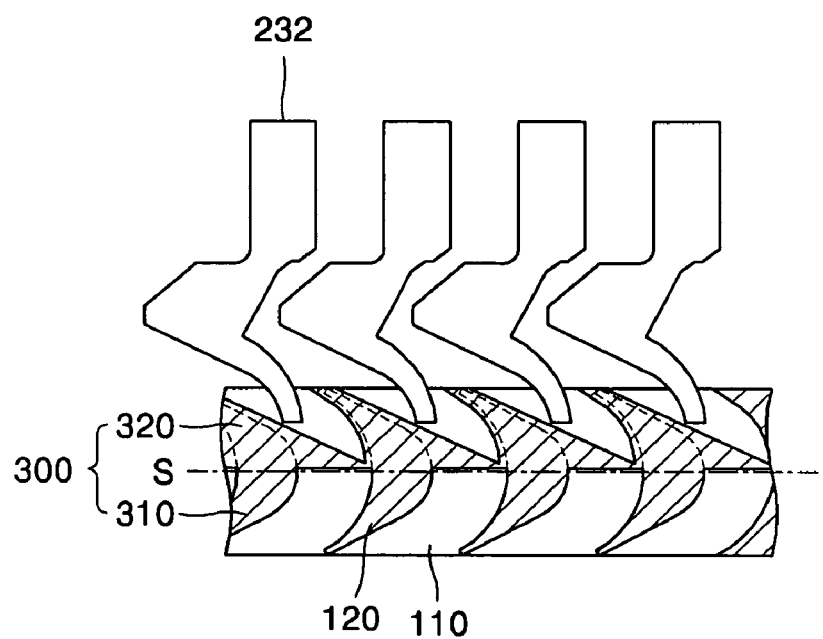
Figure 17D:
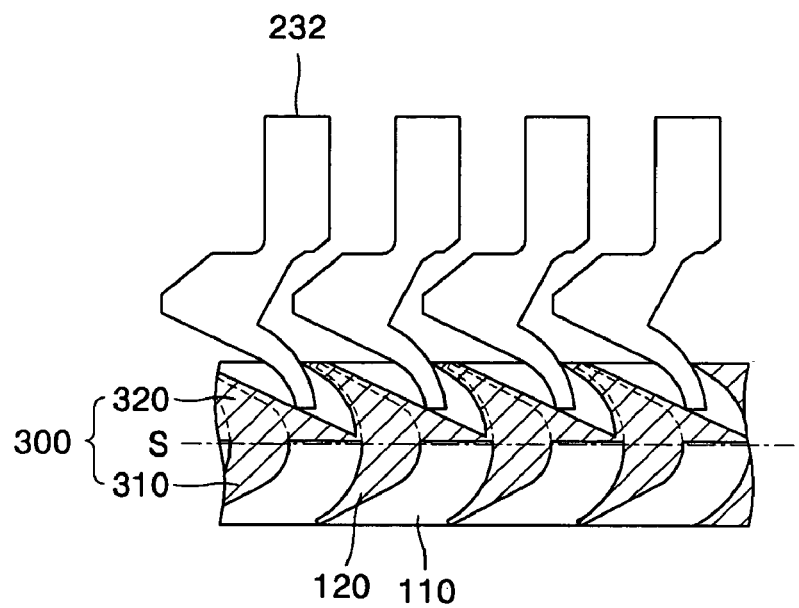

Then, it processes to the finishing process of the second portion. Referring to FIG. 17A, the rouging electrodes installed to the electrode holder is replaced with the finishing tool electrode 232, and the finishing reference height $h_4$ is set as described above with reference to FIG. 10. The information on the finishing machining route is inputted, in which the information on a finishing lead angle $\alpha_4$ in the first finishing process and a circumferentially transfer amount $\phi_2$ (FIG. 17F) in the second finishing process are inputted into the electric-discharge machining apparatus. Preferably, the finishing lead angle $\alpha_4$ and the circumferentially transfer amount $\phi_2$ are set identically with the finishing lead angle $\alpha_2$ (FIG. 13A) and the circumferentially transfer amount $\phi_1$ (FIG. 13F) set in the machining process of the first portion.

Figure 17E:
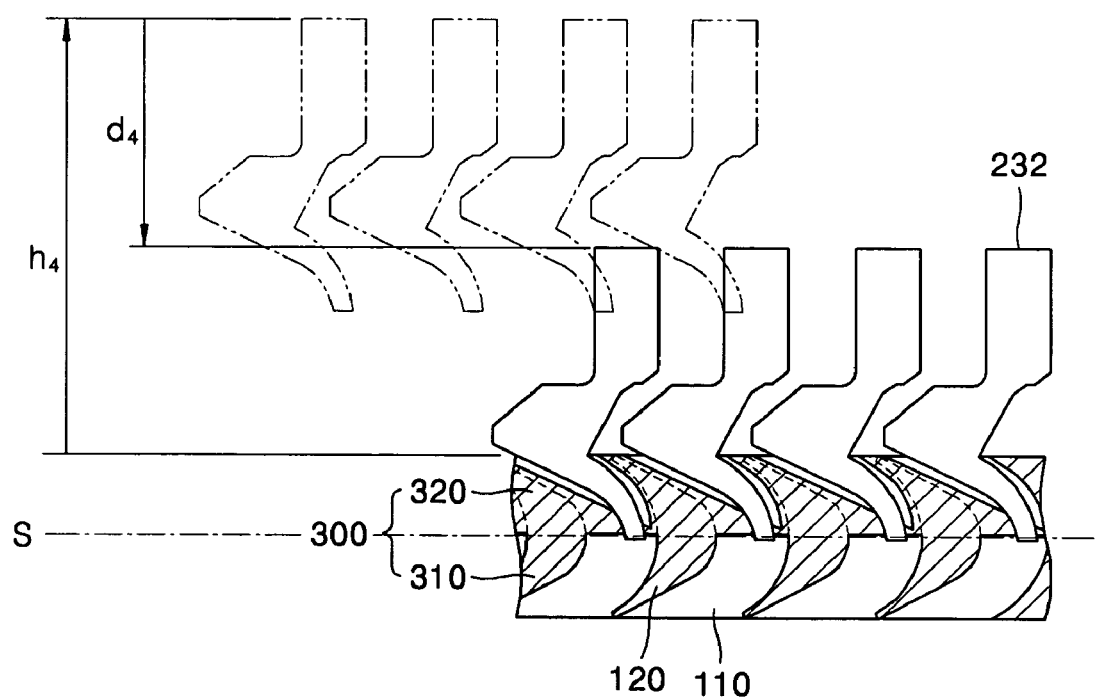

And, the first finishing electric-discharge machining is performed, as shown in FIGS. 17B through 17E. The finishing tool electrode 232 moves at the set lead angle $\alpha_4$ to perform the electric machining. The electrode holder to which the finishing tool electrode 232 is installed is concurrently controlled at the vertical direction (Z direction) and circumferential direction (C direction) of the disc material, so that the finishing tool electrode 232 is moved along the desired lead angle. The first finishing process progresses until the finishing tool electrode 232 reaches by the roughing depth $d_2$ which is previously inputted, as shown in FIG. 17E, and then it processes to the second finishing process.

Figure 17F:
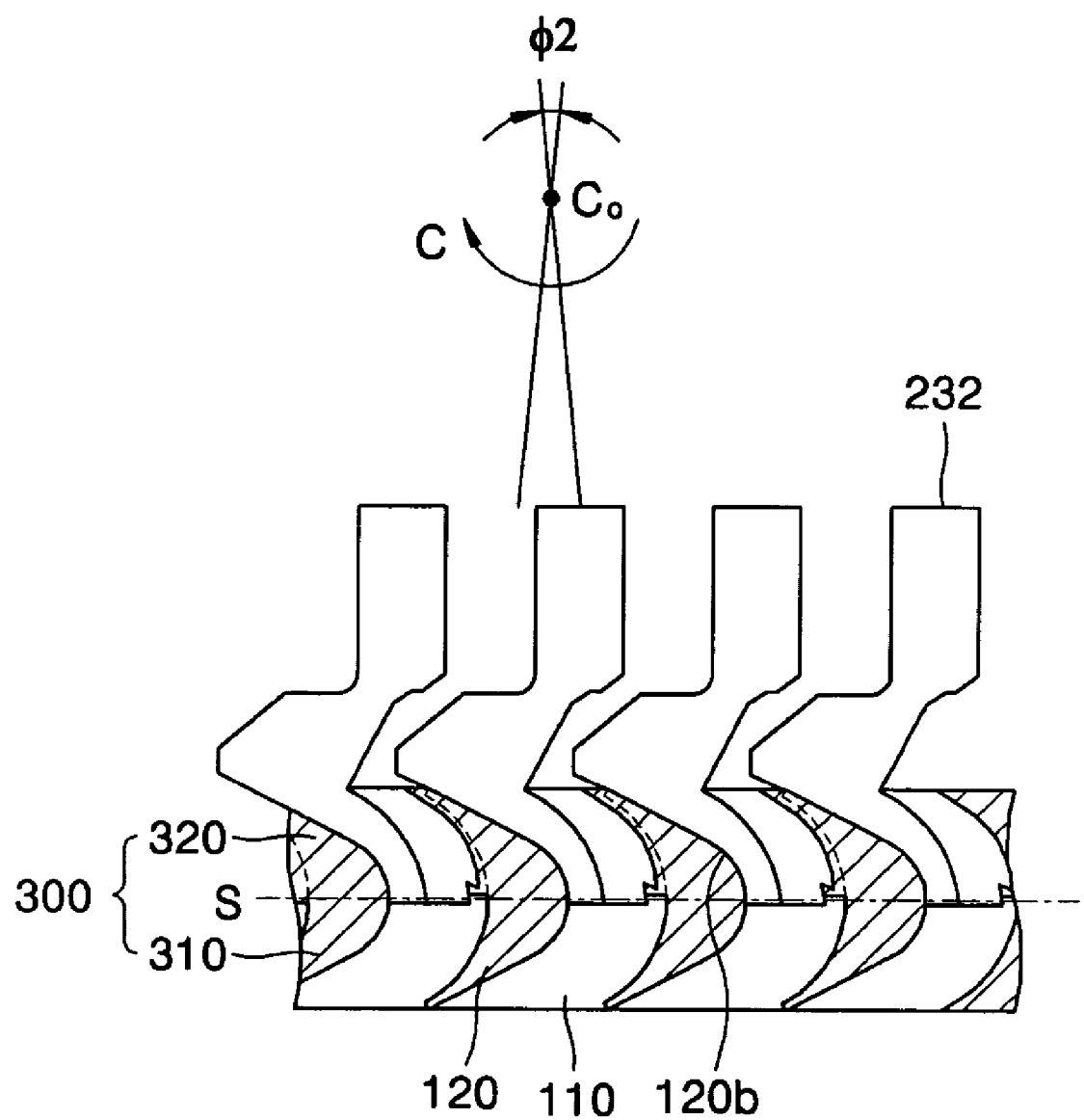
Figure 17G:
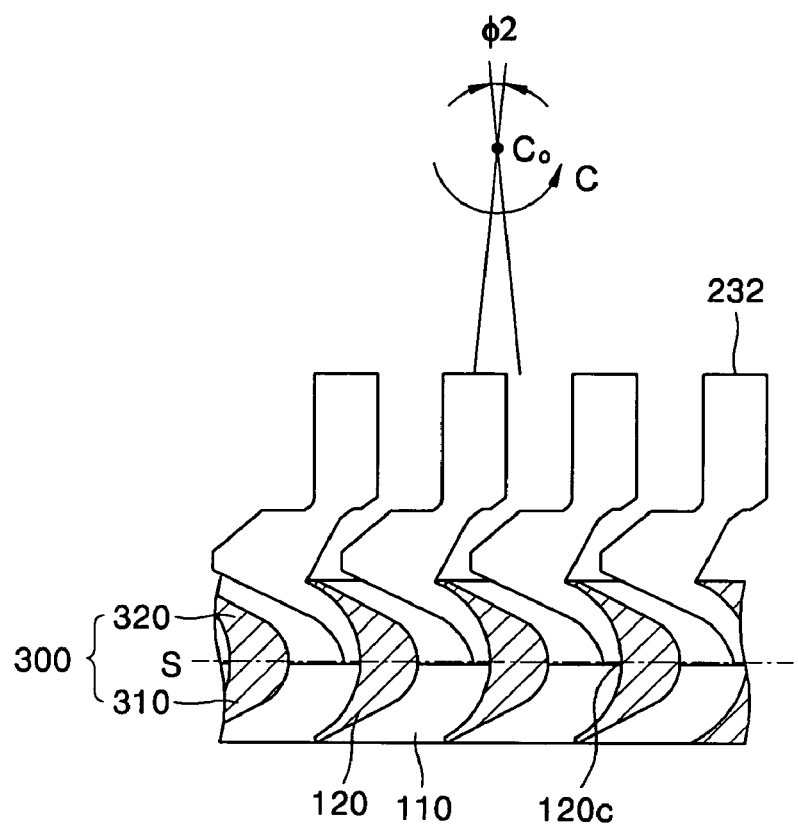
Figure 18:
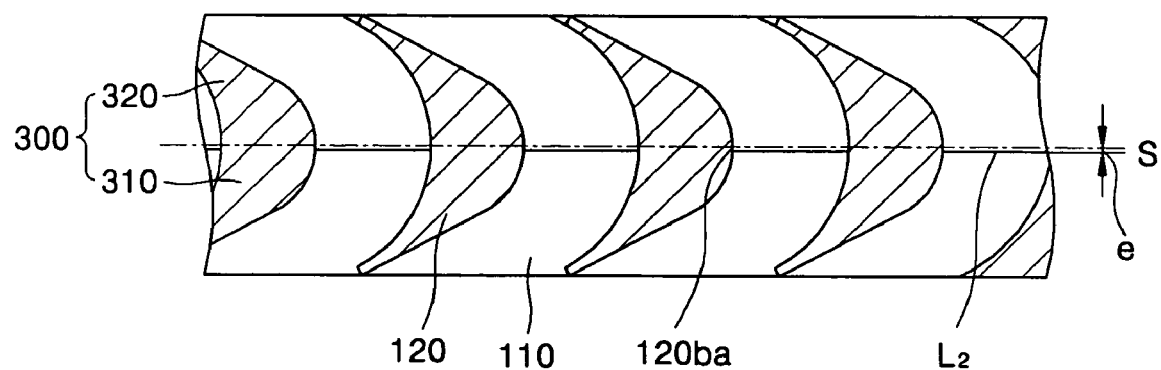
FIG. 18 is a cross-sectional view illustrating a shape of a disc material formed through a second finishing process.

In the second finishing process, the finishing tool electrode 232 is secured in a vertical direction, as shown in FIGS. 17F and 17G, while reciprocates by the set transfer amount $\phi_2$ in the circumferential direction (C direction) to form a convex portion and a concave portion. More specifically, the finishing tool electrode 232 is moved in the circumferential direction (C direction), as shown in FIG. 17F, to form a convex portion 120b of the blade. Then, the finishing tool electrode 232 is moved in the reverse circumferential direction (C direction), as shown in FIG. 17G, to form a concave portion 120c of the blade. The transfer of the finishing tool electrode 232 is performed by fixing the electrode holder in the vertical direction (Z direction) and reciprocating the electrode holder in the circumferential direction (C direction) under the control of the numerical control unit. The second portion 320 of the disc material is machined through the finishing process, as shown in FIG. 18. Preferably, a lower end $L_2$ of the second machining portion is formed as deep as a tolerance e relative to the symmetrical line S. Preferably, the tolerance is in a range from 0.1 mm to 0.3 mm. As a result, a boundary portion 120ba between the first and second portions 310 and 320 of the disc material are overlaid and machined, thereby eliminating the mismatch between the first and second portions (see FIG. 5).

The apparatus and method for electric-discharging machining the turbine blade according to the present invention have the following advantages.

First, the method for electric-discharging machining the turbine blade according to the present invention includes the roughing process of securing a leading space of the tool electrode and the finishing process of performing a precise machining of the blade, so that there is no limitation on the shape of the turbine blade. For example, it is possible to manufacture a turbine blade having a narrow gap between the blades or a turbine blade with integral shroud.

Second, the method overlayingly machines the first portion and second portion by the clearance, thereby preventing the mismatch from occurring between the first and second portions.

Finally, the method concurrently machines the shape of the blade using at least two tool electrodes, thereby shortening the machining time and thus improving the productivity, in comparison with a conventional machining method in which each blade is moved in a circumferential direction to form blades one by one. In addition, errors are not accumulated at the setting process, thereby manufacturing the turbine blade in a high precision.

While the present invention has been particularly shown and described with reference to exemplary embodiments thereof, it will be understood by those of ordinary skill in the art that various changes in form and details may be made therein without departing from the spirit and scope of the present invention as defined by the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method for electric-discharge machining a turbine having a plurality of blades formed along a circumference thereof, the method comprising:
    a) preparing a disc material divided into a first portion and a second portion on a basis of a symmetrical line;
    b) fixing the disc material, with the first portion facing upward;
    c) forming an initial profile of at least one of the plurality of blades at the first portion of the disc material using at least two roughing tool electrodes to concurrently form a roughing space at the first portion, the at least two roughing tool electrodes moving generally downward and circumferentially along a desired roughing lead angle with respect to a surface of the first portion;
    d) leading at least two finishing tool electrodes into the roughing space to concurrently machine the at least one of the plurality of blades, the at least two finishing tool electrodes moving generally downward and circumferentially along a desired finishing lead angle with respect to a surface of the first portion and each of the at least two finishing tool electrodes pivotally reciprocate about a reciprocation axis generally parallel with the surface of the first portion;
    e) rotating the disc material and fixing the disc material, with the second portion facing upward;
    f) forming an initial profile of the at least one of the plurality of blades at the second portion of the disc material using at least two roughing tool electrodes to concurrently form a roughing space at the second portion, the at least two roughing tool electrodes moving generally downward and circumferentially along the desired roughing lead angle with respect to a surface of the second portion; and
    g) leading at least two finishing tool electrodes into the roughing space formed at the second portion to concurrently machine the at least one of the plurality of blades, the at least two finishing tool electrodes moving generally downward and circumferentially along the desired finishing lead angle with respect to a surface of the second portion and each of the at least two finishing tool electrodes pivotally reciprocate about a reciprocation axis generally parallel with the surface of the second portion, and
    wherein the at least two finishing tool electrodes cut through the symmetrical line by about 0.1 mm to about 0.3 mm.

2. The method according to claim 1, wherein the at least two roughing tool electrodes and the at least two finishing tool electrodes are formed corresponding to a shape of the blade, but are formed in a different shape to each other.

3. The method of claim 1, wherein the turbine includes a shroud integrally formed with the disc material along the circumference thereof.

4. The method according to claim 1 wherein the desired roughing lead angle is different than the desired finishing lead angle.

5. An apparatus for electric-discharge machining a turbine having a plurality of blades formed along a circumference thereof, comprising:
    an electrode holder including a plurality of mounting grooves, in which at least two tool electrodes are arranged and mounted in a circumferential direction of the turbine corresponding to the blade; and
    a mounting frame opposed to the electrode holder for supporting a disc material.

6. The apparatus according to claim 5, wherein:
    the at least two tool electrodes comprise a plurality of tool electrodes that are arranged corresponding to the plurality of blades; and
    the plurality of tool electrodes are spaced apart from each other at a gap corresponding to one pitch of at least one of the plurality of blades.

7. The apparatus according to claim 5, further comprising:
    an electric-discharge voltage generating unit for applying an electric-discharge voltage to the at least two tool electrodes;
    a tool electrode transferring unit for moving the electrode holder in a vertical direction and a circumferential direction; and
    a numerical control unit for controlling the electric-discharge voltage generating unit and the tool electrode transferring unit.

8. The apparatus according to claim 5, wherein the electrode holder is concurrently controlled in a vertical and circumferential direction.

9. A method for electric-discharge machining a turbine having a plurality of blades formed along a circumference thereof, the method comprising:
    a) providing a disc material having a first side and a second side;
    b) positioning the disc material, with the first side facing a machining device;
    c) forming an initial profile of at least one of the plurality of blades on the first side of the disc material using at least two roughing tool electrodes to concurrently form a roughing space on the first side, the at least two roughing tool electrodes moving generally downward and circumferentially along a desired roughing lead angle with respect to a surface of the first side;
    d) leading at least two finishing tool electrodes into the roughing space to concurrently machine the at least one of the plurality of blades, the at least two finishing tool electrodes moving generally downward and circumferentially along a desired finishing lead angle with respect to the surface of the first side and each of the at least two finishing tool electrodes pivotally reciprocate about a reciprocation axis generally parallel with the surface of the first side;
    e) rotating and positioning the disc material, with the second side facing the machining device;
    f) forming an initial profile of the at least one of the plurality of blades on the second side of the disc material using at least two roughing tool electrodes to concurrently form a roughing space on the second side, the at least two roughing tool electrodes moving generally downward and circumferentially along the desired roughing lead angle with respect to a surface of the second side; and
    g) leading at least two finishing tool electrodes into the roughing space formed on the second side to concurrently machine the at least one of the plurality of blades, the at least two finishing tool electrodes moving generally downward and circumferentially along the desired finishing lead angle with respect to the surface of the second side and each of the at least two finishing tool electrodes pivotally reciprocate about a reciprocation axis generally parallel with the surface of the second side.

10. The method according to claim 9, wherein in the leading operations the disc material proximate a symmetrical line bisecting the disc material into a first half including the first side and a second half including the second side is cut by the at least two finishing tool electrodes to be about 0.1 mm to about 0.3 mm lower than the symmetrical line.

11. The method according to claim 9, wherein the at least two roughing tool electrodes and the at least two finishing tool electrodes are formed corresponding to a shape of the blade, but are formed in a different shape to each other.

12. The method according to claim 9 wherein the desired roughing lead angle is different than the desired finishing lead angle.

* * * * *